United States Patent [19]

Putland et al.

[11] Patent Number: 5,720,023
[45] Date of Patent: Feb. 17, 1998

[54] APPARTUS AND METHOD FOR STORING DIAGRAM DATA

[75] Inventors: Paul Anthony Putland, Ipswich; Peter John Skevington, Woodbridge; Ian David Edmund Videlo, Woodbridge; John Peter Wittgreffe, Woodbridge; Martin John Yates, Stowmarket, all of United Kingdom

[73] Assignee: British Telecommnications public limited company, London, United Kingdom

[21] Appl. No.: 647,922

[22] PCT Filed: Mar. 22, 1995

[86] PCT No.: PCT/GB95/00631
 § 371 Date: May 29, 1996
 § 102(e) Date: May 29, 1996

[87] PCT Pub. No.: WO95/26532
 PCT Pub. Date: Oct. 5, 1995

Related U.S. Application Data

[63] Continuation-in-part of Ser. No. 263,221, Jun. 21, 1994, abandoned.

[30] Foreign Application Priority Data

Mar. 28, 1994 [EP] European Pat. Off. .............. 94302210

[51] Int. Cl.⁶ .................................................. G06F 15/00
[52] U.S. Cl. ........................................................ 395/140
[58] Field of Search .................................. 395/140, 141, 395/133; 345/117, 118

[56] References Cited

U.S. PATENT DOCUMENTS 4,843,569 6/1989 Sawada et al. .................. 364/518
5,617,523 4/1997 Imazu et al. ..................... 395/140

FOREIGN PATENT DOCUMENTS

0415796 A3 3/1991 European Pat. Off. .

OTHER PUBLICATIONS

Yamamoto et al, "Extraction of Object Features from Image and Its Application to Image Retriever", 9th International Conference on Pattern Recognition, 14–17 Nov. 1988, Rome, Italy, pp. 988–991.

Goers et al, "Definition and Application of Metaclasses in an Object–Oriented Database Model", 1993 IEEE, pp. 373–380, Department of Computer Science, Technical University of Clausthal, Germany.

*Primary Examiner*—Phu K. Nguyen
*Attorney, Agent, or Firm*—Nixon & Vanderhye P.C.

[57] ABSTRACT

An apparatus for storing data for use in displaying diagrams comprises a computer and a file server. Each diagram includes boxes and flow lines connecting the boxes. The software includes a database and a main program which is responsible for storing and retrieving diagram data as well as performing predetermined operations on the data. In the database, data describing a box is stored as an instance of a first software object class, data describing a flow line is stored as an instance of a second software object class, general data relating to a diagram is stored as an instance of a third software object class, and data describing the location of each entity (box or flow line) on a diagram is stored as an instance of a fourth software object class. Each instance of the fourth software object class includes a pointer to the instance of the third software object class which contains general data for the diagram and also to a pointer to the instance of the first or second software object class which describe the entity.

19 Claims, 20 Drawing Sheets

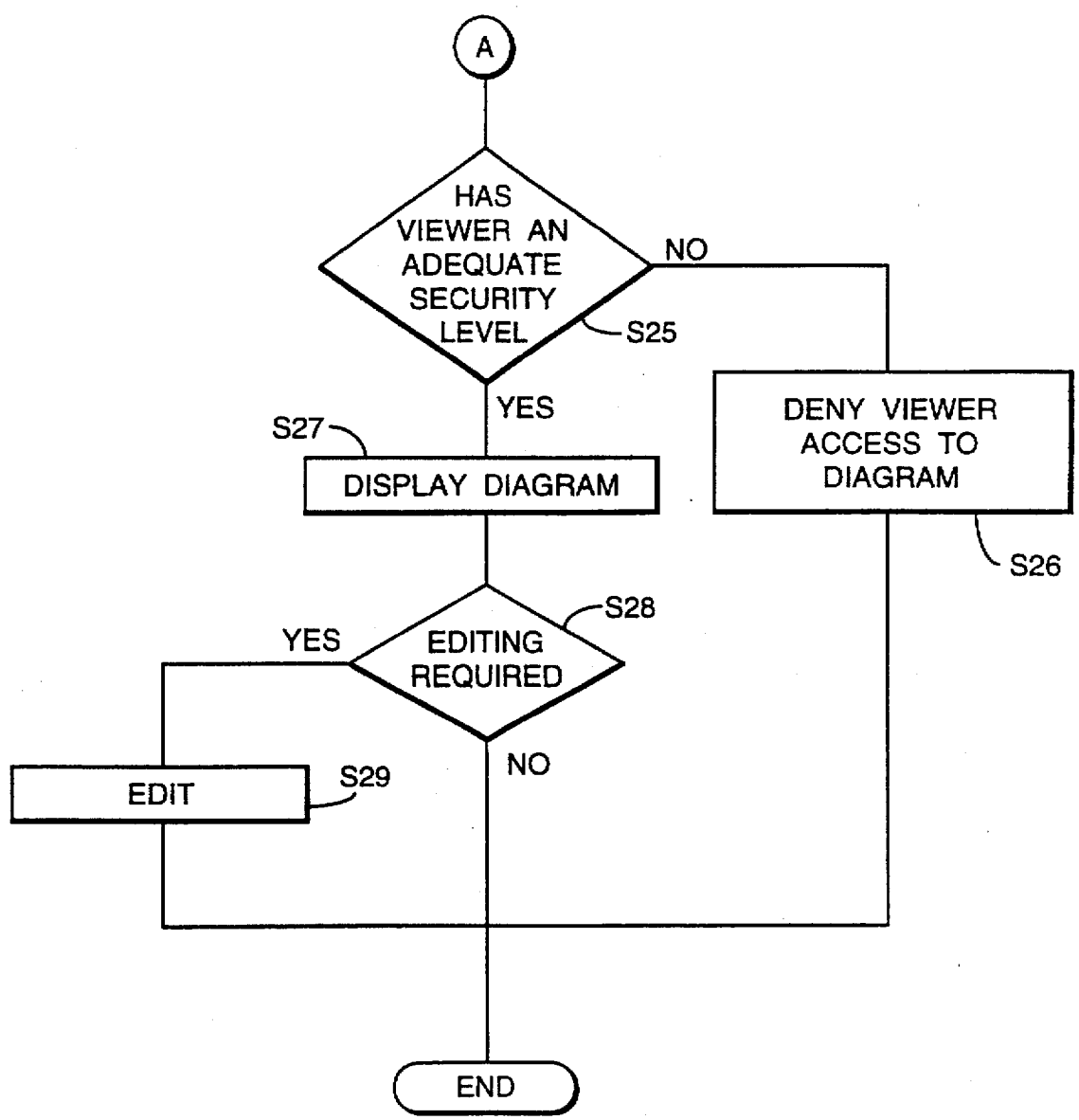

1

APPARTUS AND METHOD FOR STORING DIAGRAM DATA

CROSS-REFERENCE TO RELATED APPLICATIONS

This application is a continuation of our copending commonly assigned PCT application No. PCT/GB95/00631 and it is also a continuation-in-part of our commonly assigned application Ser. No. 08/263,221 filed Jun. 21, 1994 now ABN.

This invention relates to an apparatus for storing data for use in displaying diagrams and also to a method of storing diagram data and using the stored data for displaying diagrams.

When storing data for use in displaying diagrams, it is desirable that the data can both be stored and retrieved in an efficient manner. In particular, it is desirable to be able to store data representing a particular diagram entity so that the diagram entity can be displayed in more than one diagram.

In EP-A-0 415 796 there is described an object-oriented display system which allows the creation of graphic diagrams. In this system, each diagram is created independently and there is no disclosure of using data representing a particular diagram entity in more than one diagram.

According to one aspect of this invention there is provided a computer apparatus for storing data for use in displaying diagrams, each diagram comprising a plurality of entities, said apparatus comprising:

means for entering data for use in displaying diagrams;

means for storing data describing an individual diagram entity as a software object having a set of attributes which includes an identifier for the software object;

means for storing general data relating to an individual diagram as a software object whose attributes include an identifier for the software object;

means for storing data relating to the location of an individual entity on a diagram as a software object whose attributes include the location of the entity on the diagram and a pointer to the software-object which describes the entity;

means for retrieving data describing the individual entities of a diagram; and means for using the retrieved data for displaying a diagram.

The present invention provides the advantage that data describing a particular diagram entity can be used in displaying that diagram entity in more than one diagram.

The entities may include graphical shapes and flow lines connecting the graphical shapes together.

When the entities include graphical shapes and flow lines connecting the graphical shapes together, data describing an entity in the form of a graphical shape may be stored as a software object belonging to a software object class for graphical shapes, and data describing an entity in the form of a flow line may be stored as a software object belonging to a software object class for flow lines whose attributes include a pair of pointers which point to the identifiers of the two software objects which describe, respectively, the entity at one end and the entity at the other end of the flow line.

The apparatus may includes means for operating on the retrieved data in a predetermined manner to produce a desired diagram.

According to a second aspect of this invention, there is provided a computer apparatus including a central processing unit, a memory, means for entering data and a display unit, said memory containing a program for controlling the computer apparatus and which is arranged to:

receive data for use in displaying diagrams;

store data representing an individual diagram entity as a software object having a set of attributes which includes an identifier for the software object;

store general data relating to an individual diagram as a software object whose attributes include an identifier for the software object;

store data relating to the location of an individual entity on a diagram as a software object whose attributes include the location of the entity on the diagram and a pointer to the software object which describes the entity;

retrieve data describing the individual entities of a diagram; and use the retrieved data for displaying a diagram.

According to a third aspect of this invention, there is provided a method of operating a computer apparatus for storing diagram data and using the stored data for displaying diagrams, each diagram comprising a plurality of entities, said method comprising the steps of:

storing data describing each individual diagram entity as a software object having a set of attributes which includes an identifier for the object;

storing general data relating to each individual diagram as a software object whose attributes include an identifier for the software object;

storing data relating to the location of each individual entity of a diagram as a software object whose attributes include the location of the entity on the diagram and a pointer to the software object which describes the entity;

retrieving data describing the individual entities of a diagram; and using the retrieved data for displaying a diagram.

This invention will now be described in more detail, by way of example, with reference to the accompanying drawings in which.

Figure 4:
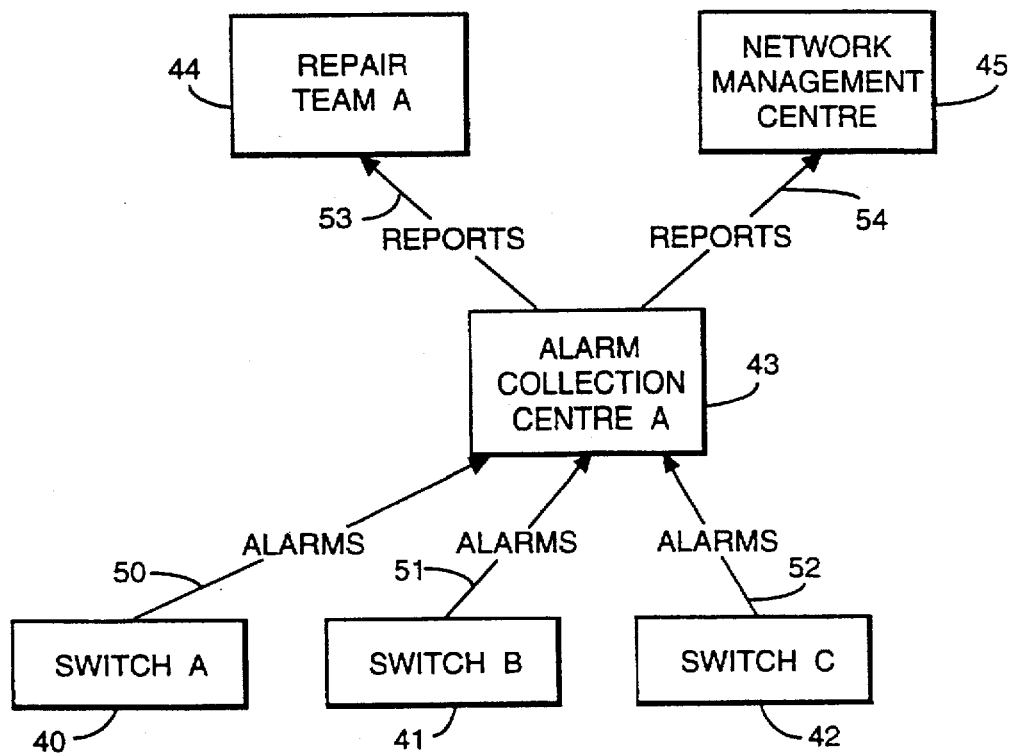
FIG. 4 is a diagram illustrating some of the components of an alarm management system for a telecommunications network which are present on a particular day.
Figure 6A:
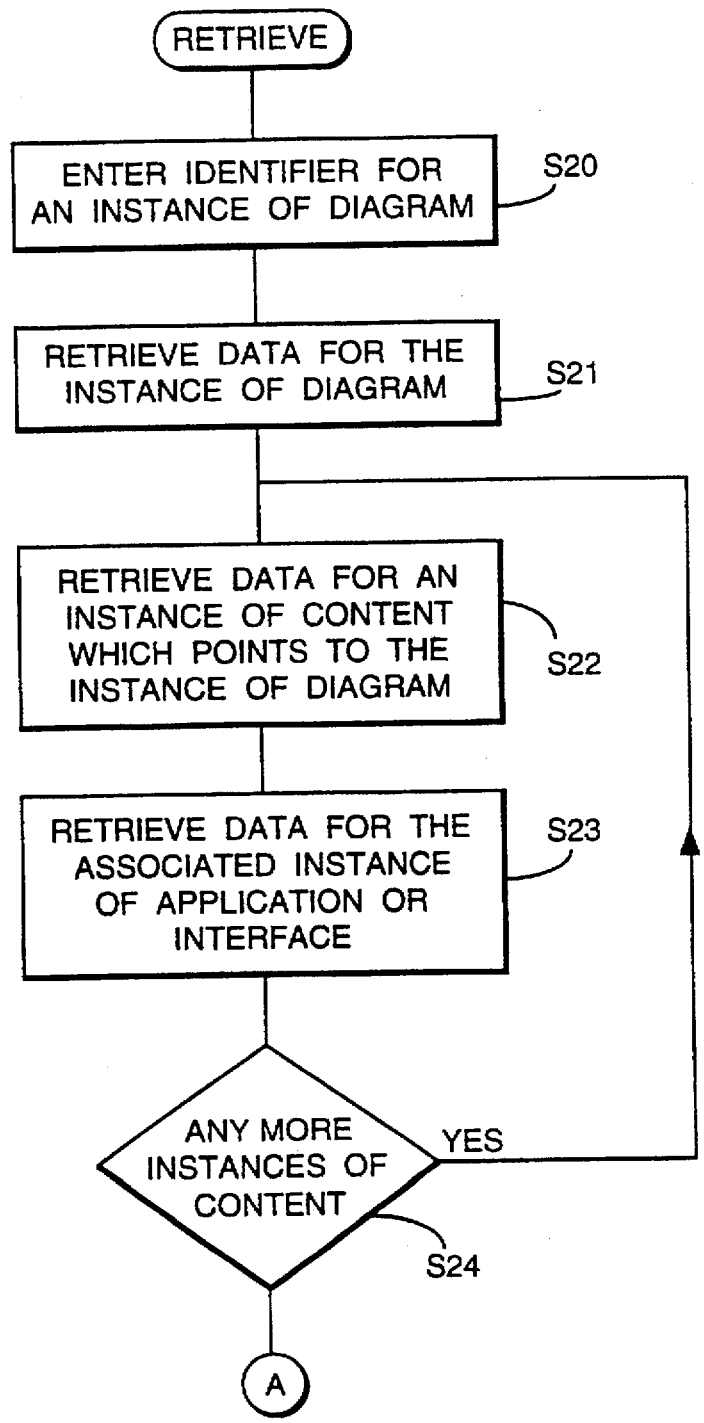
Figure 7:
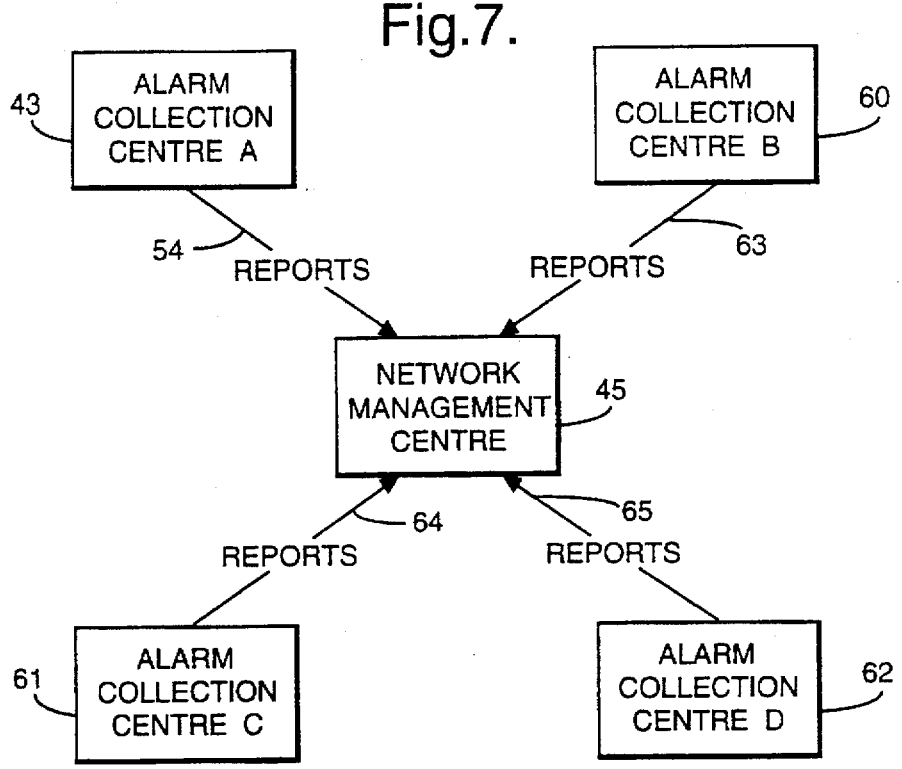
Figure 12:
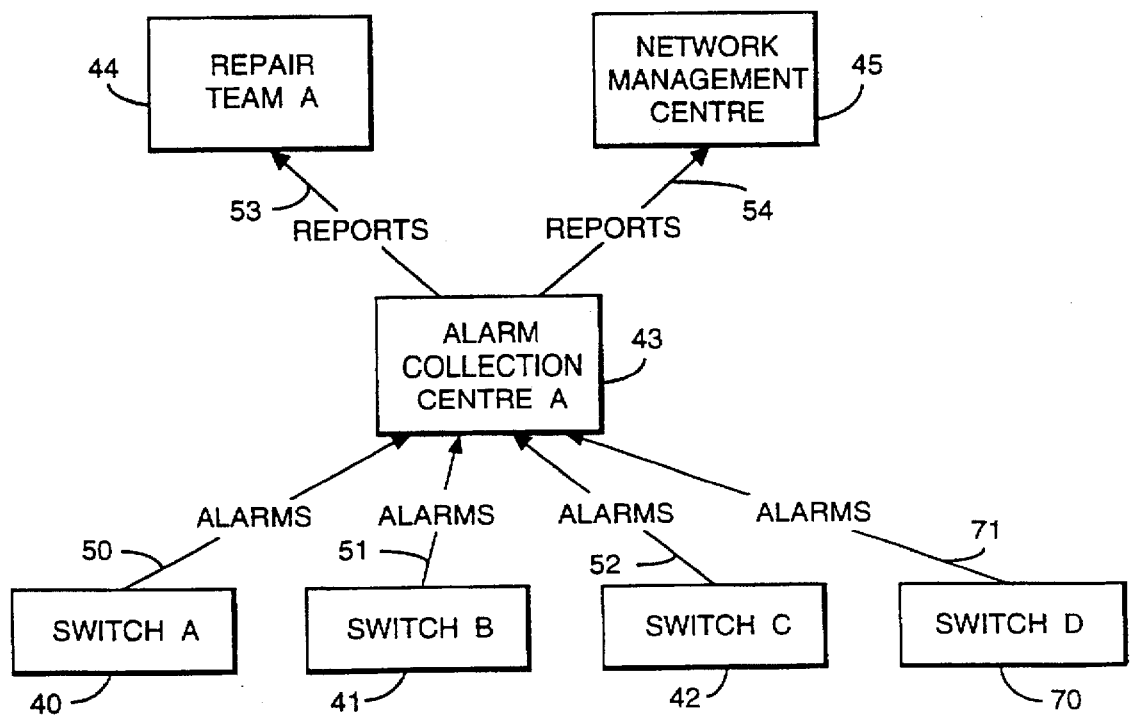
Figure 8A:
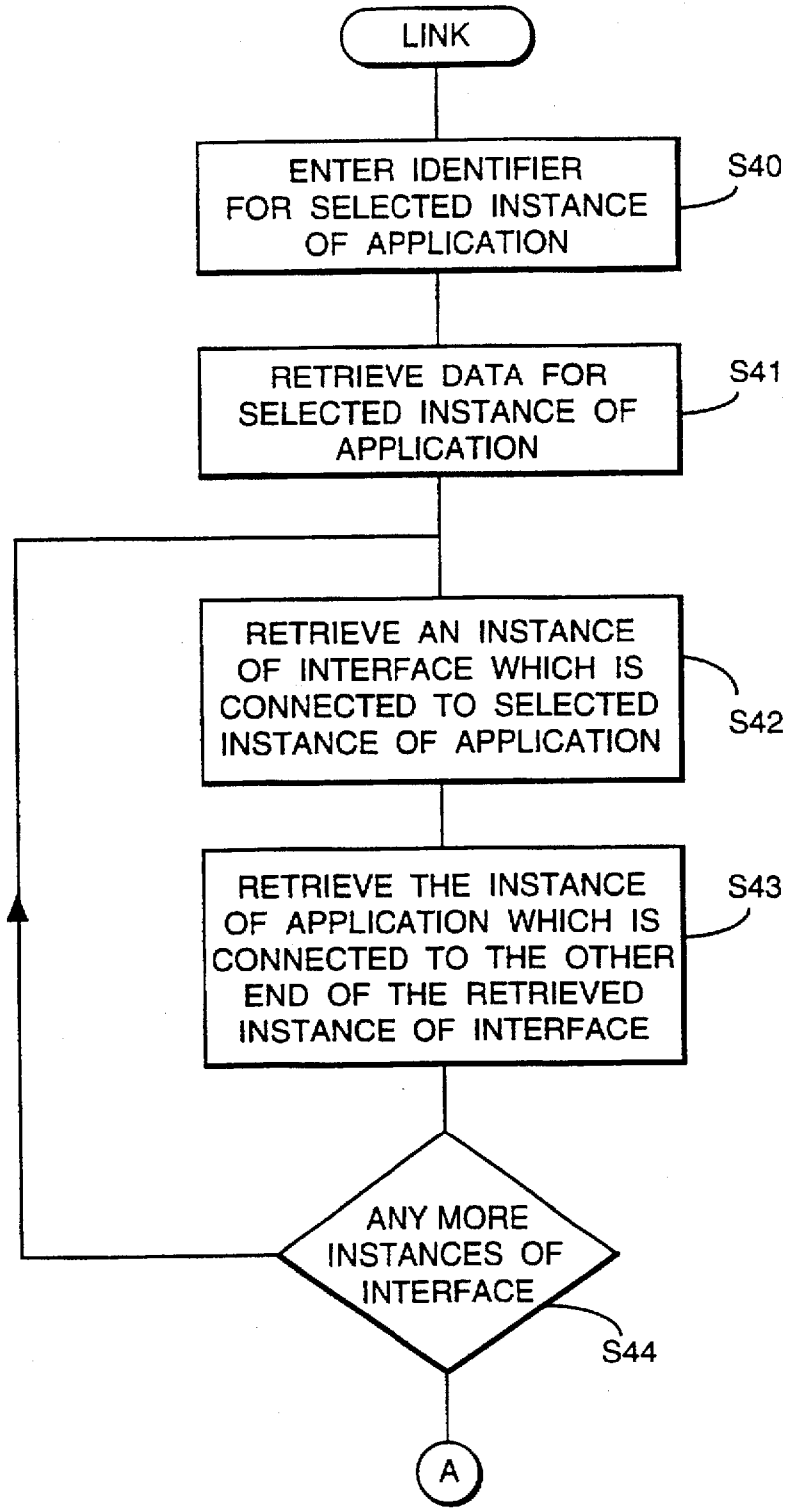
Figure 8B:
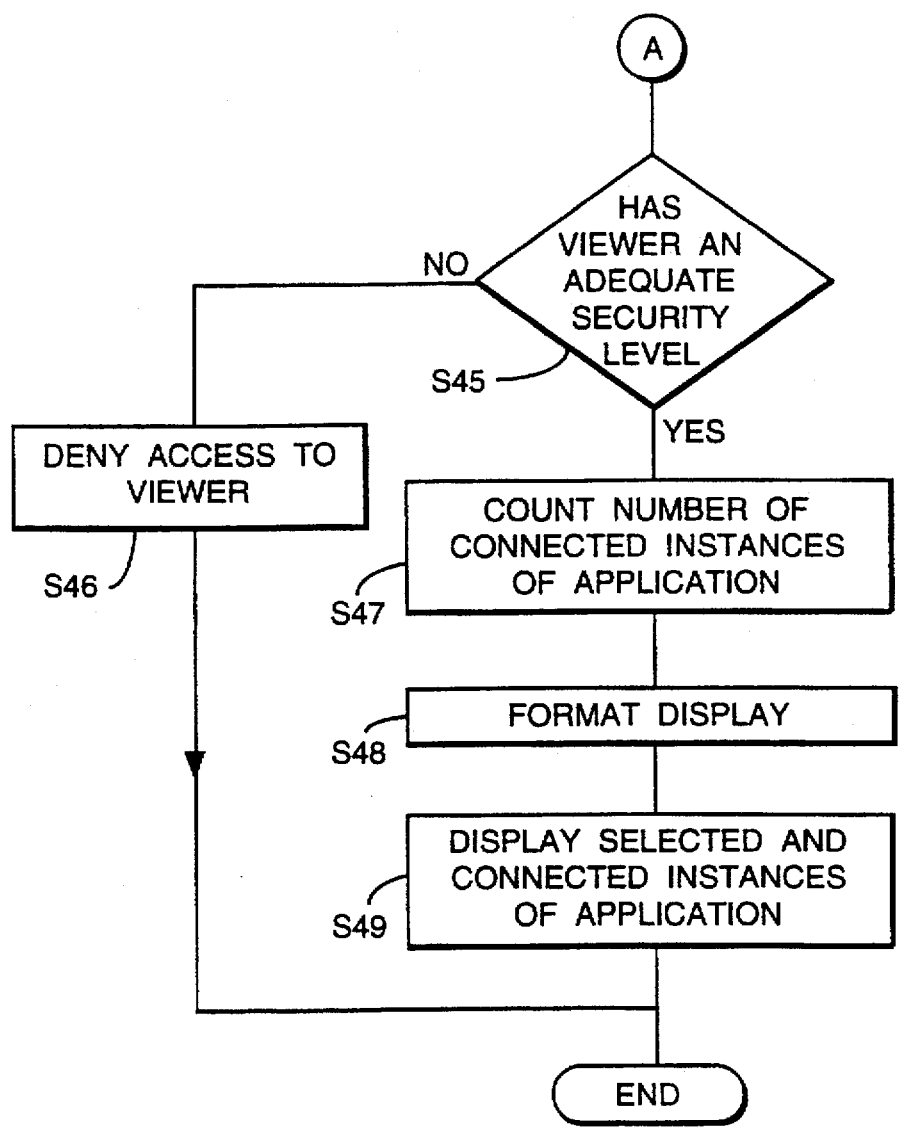
Figure 9:
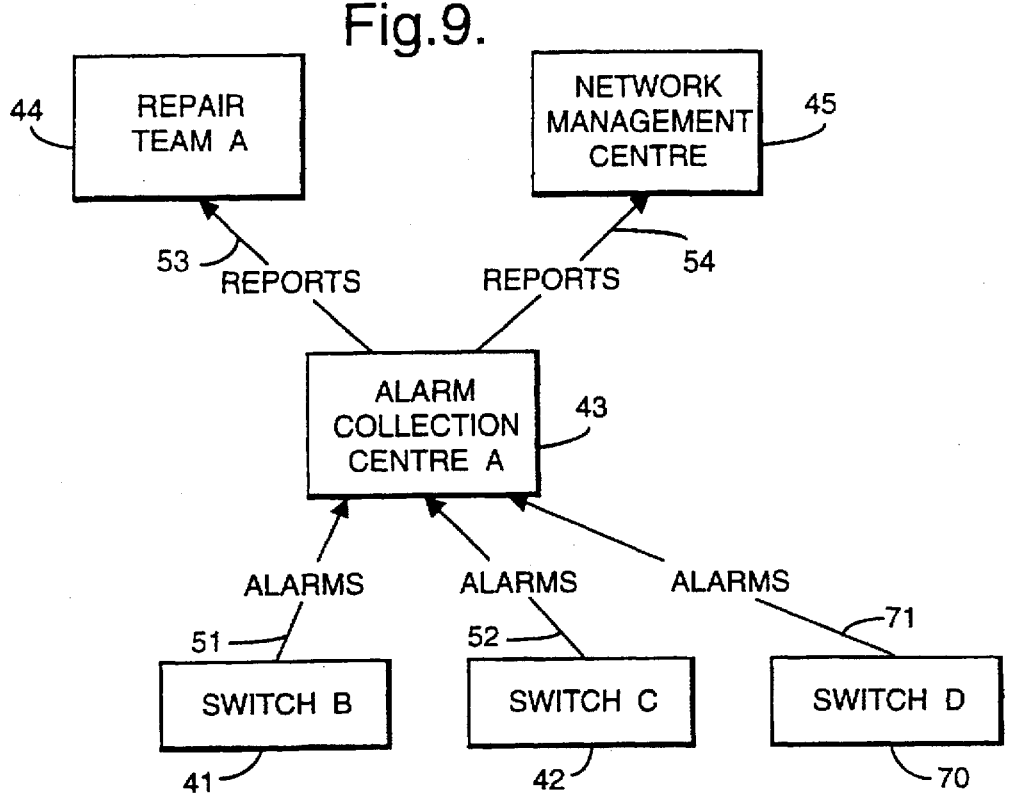
Figure 10:
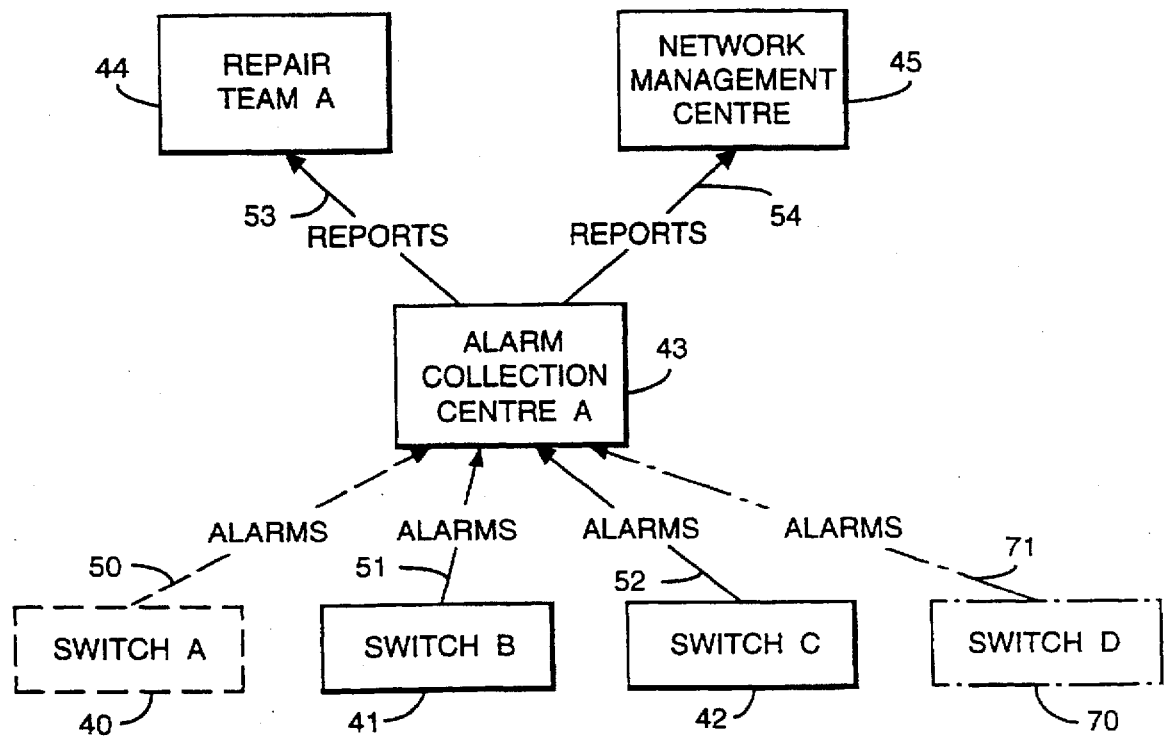
Figure 11A:
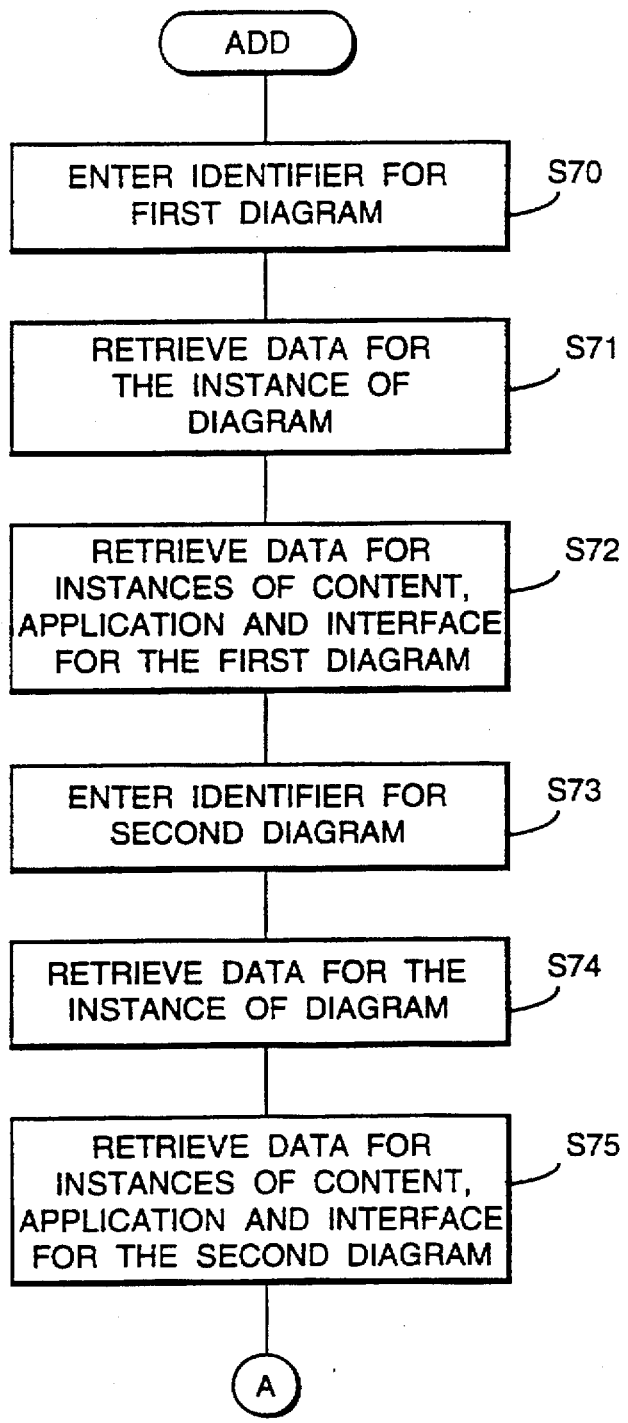
Figure 11B:
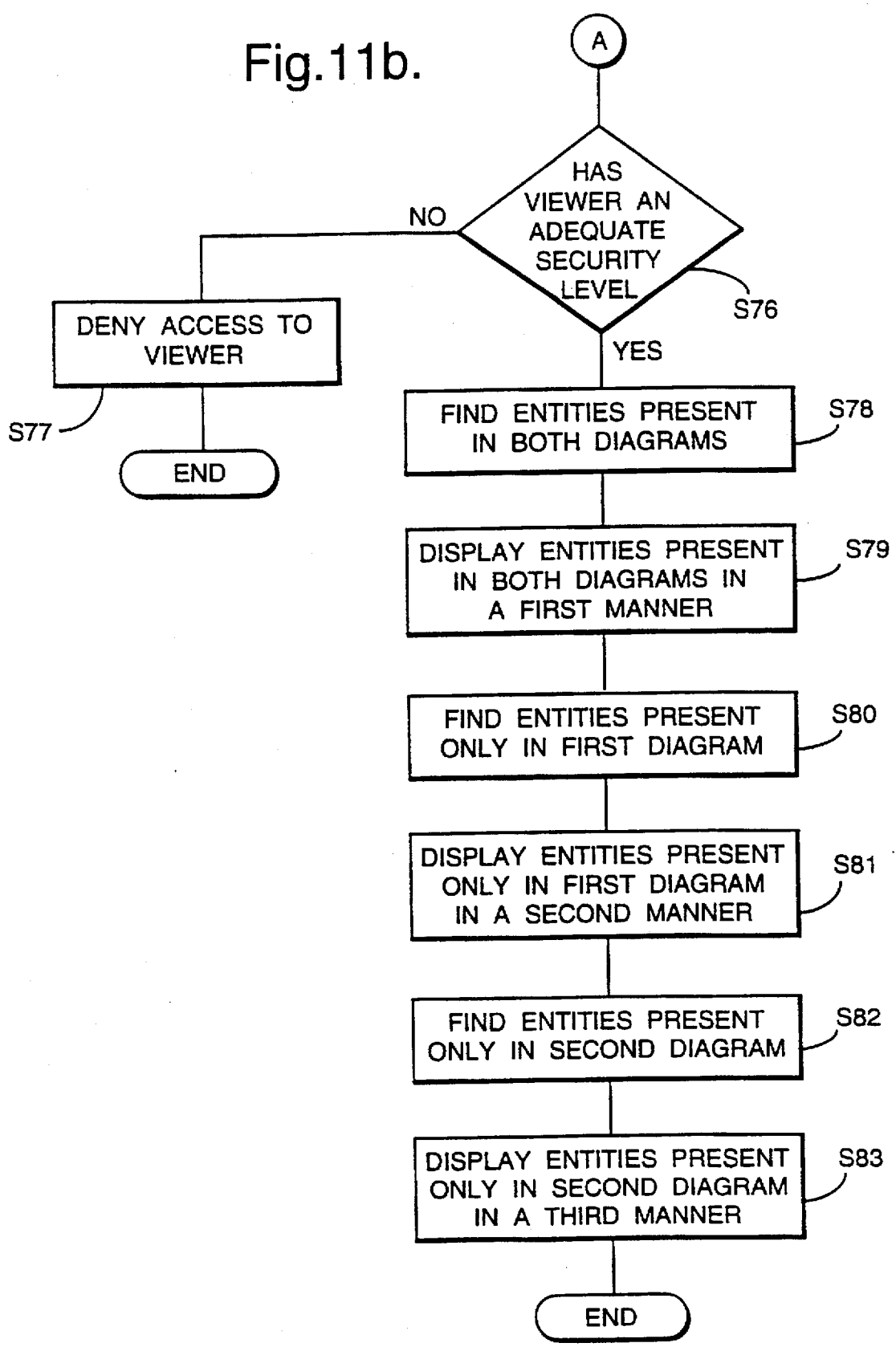
Figure 13A:
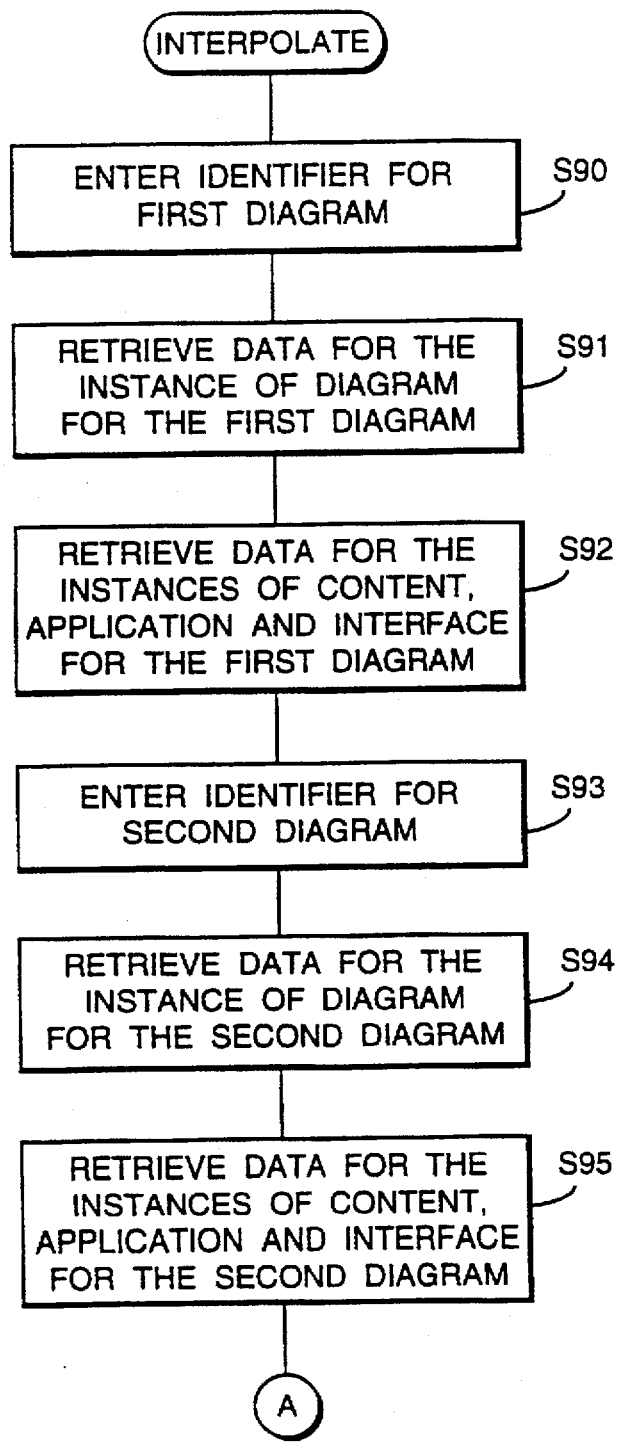
Figure 13B:
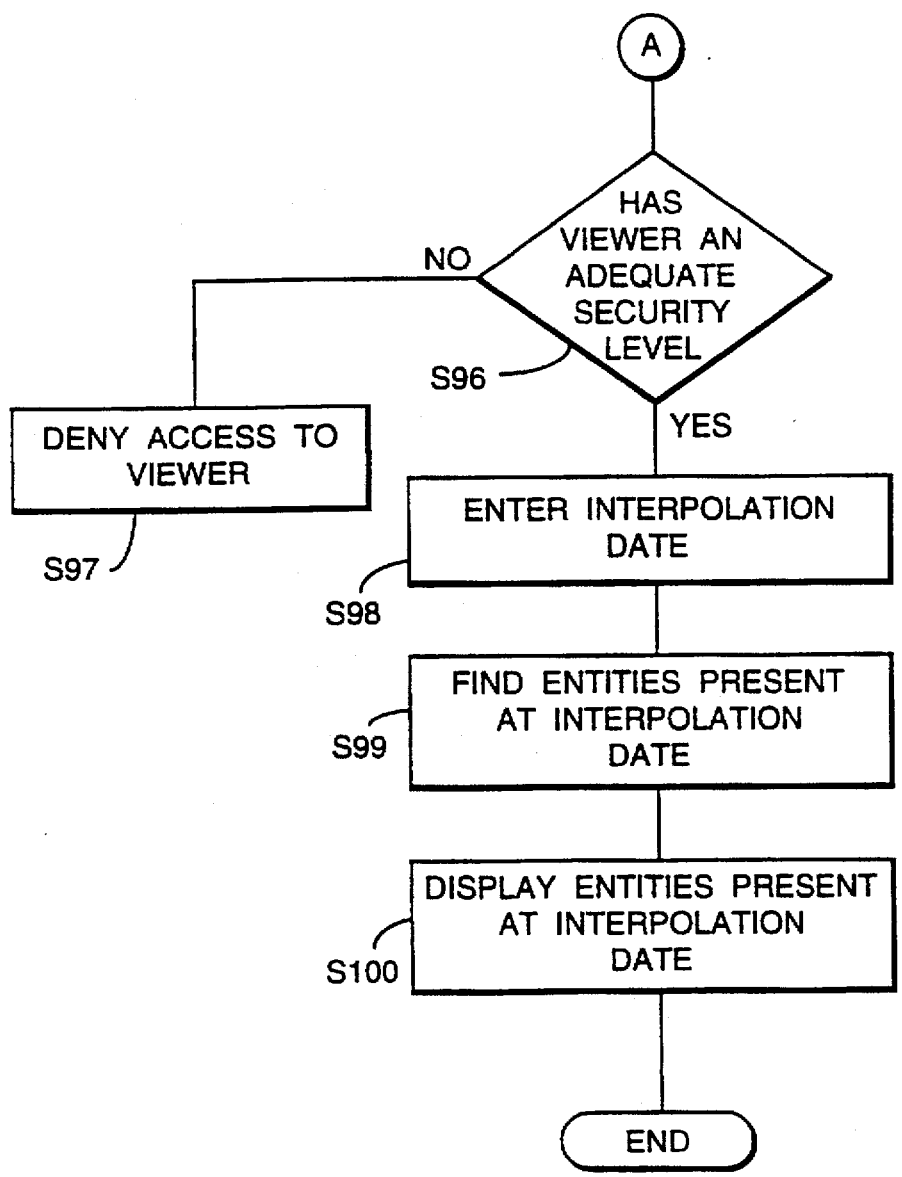
Figure 14:
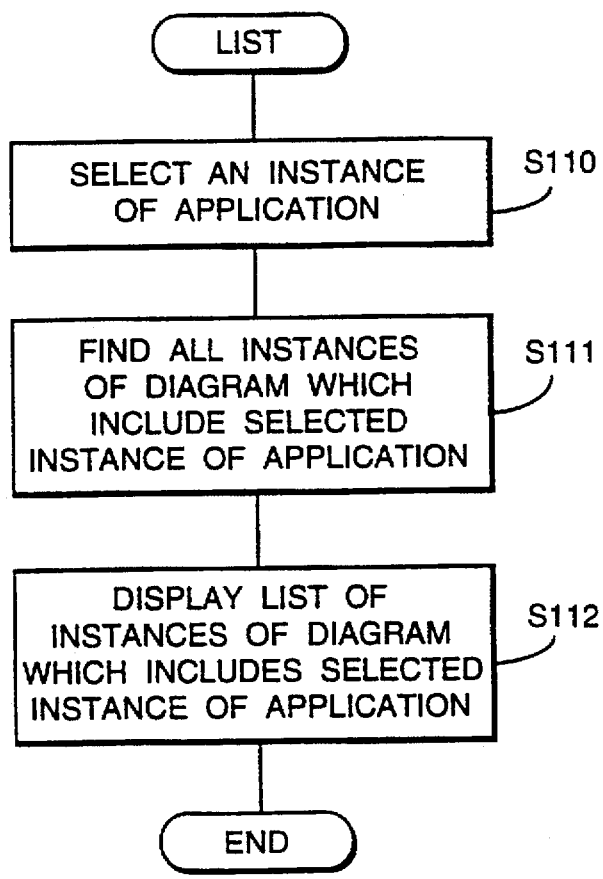
Figure 15:
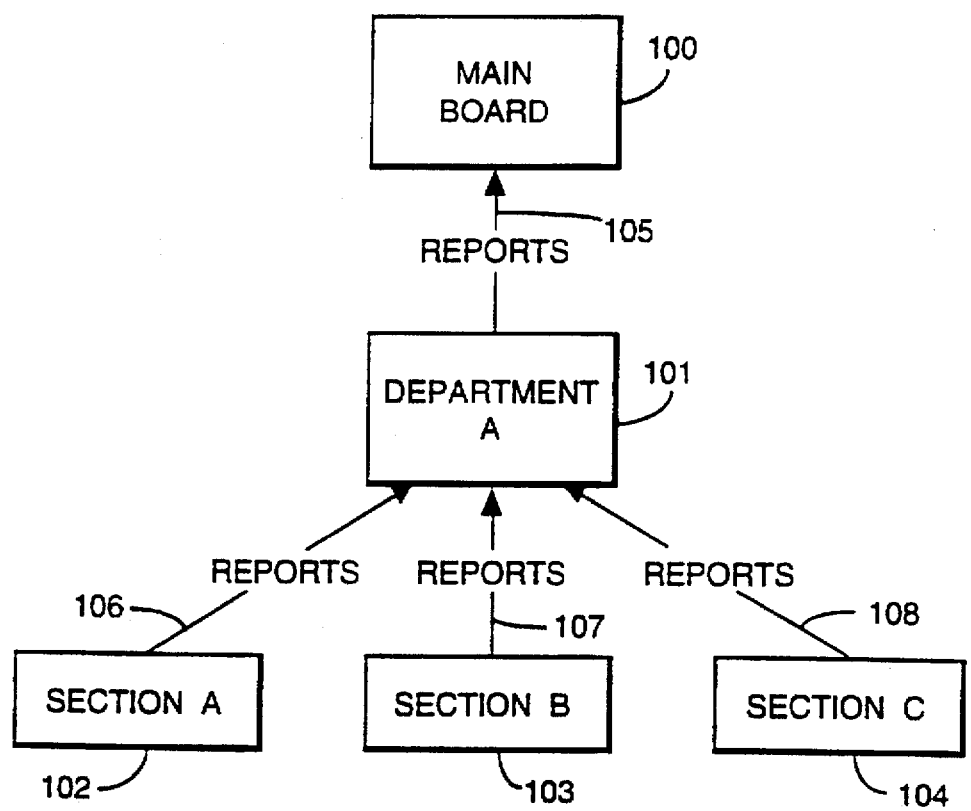
Figure 16:
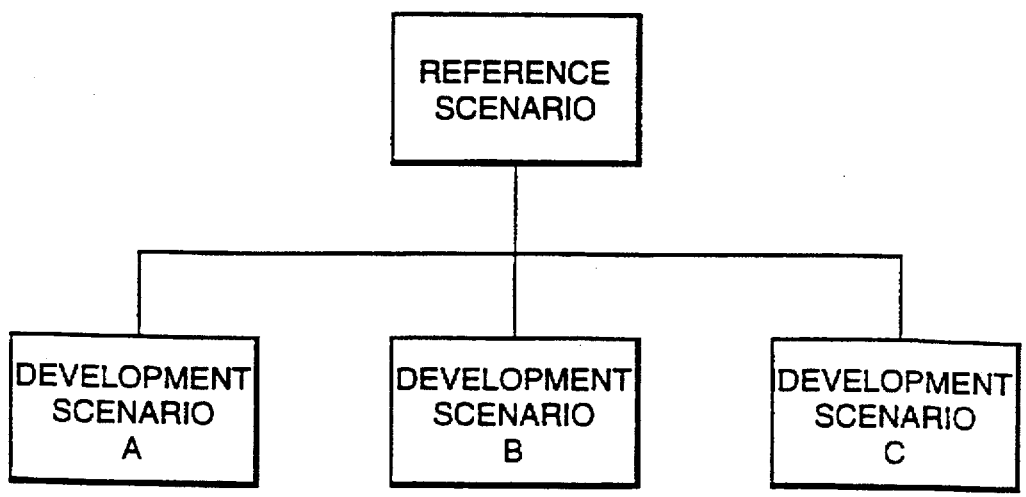
Figure 17:
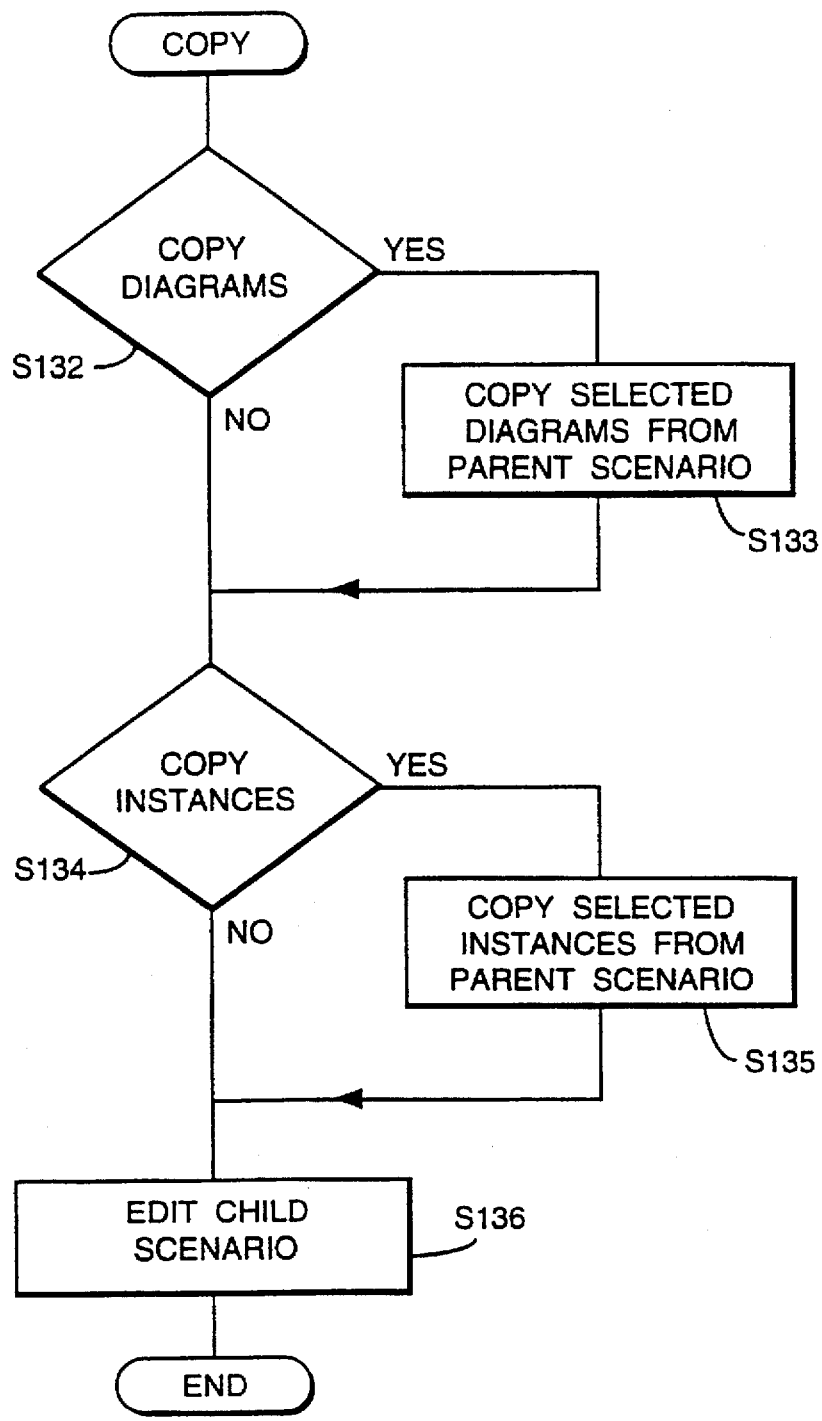
Figure 18:
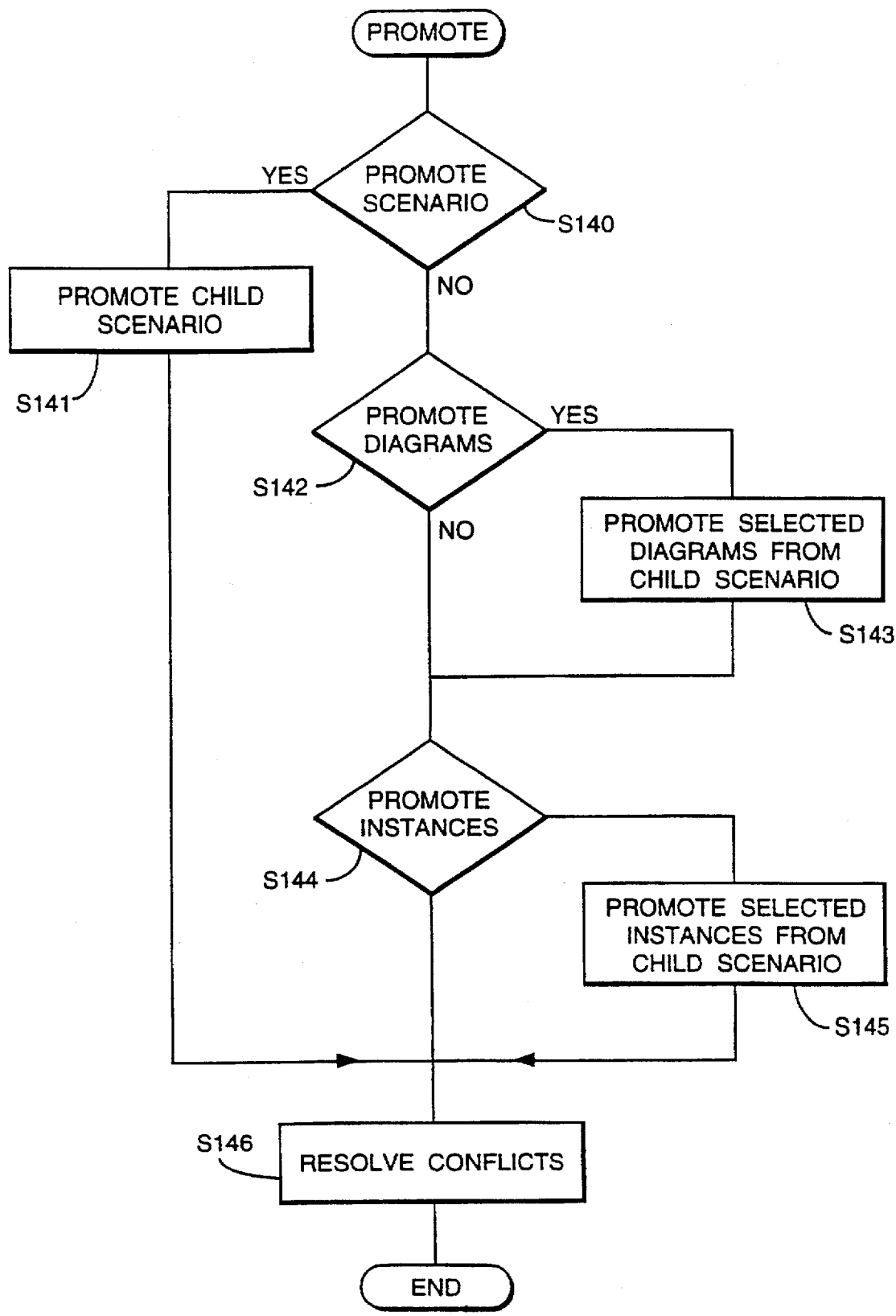
Figure 19:
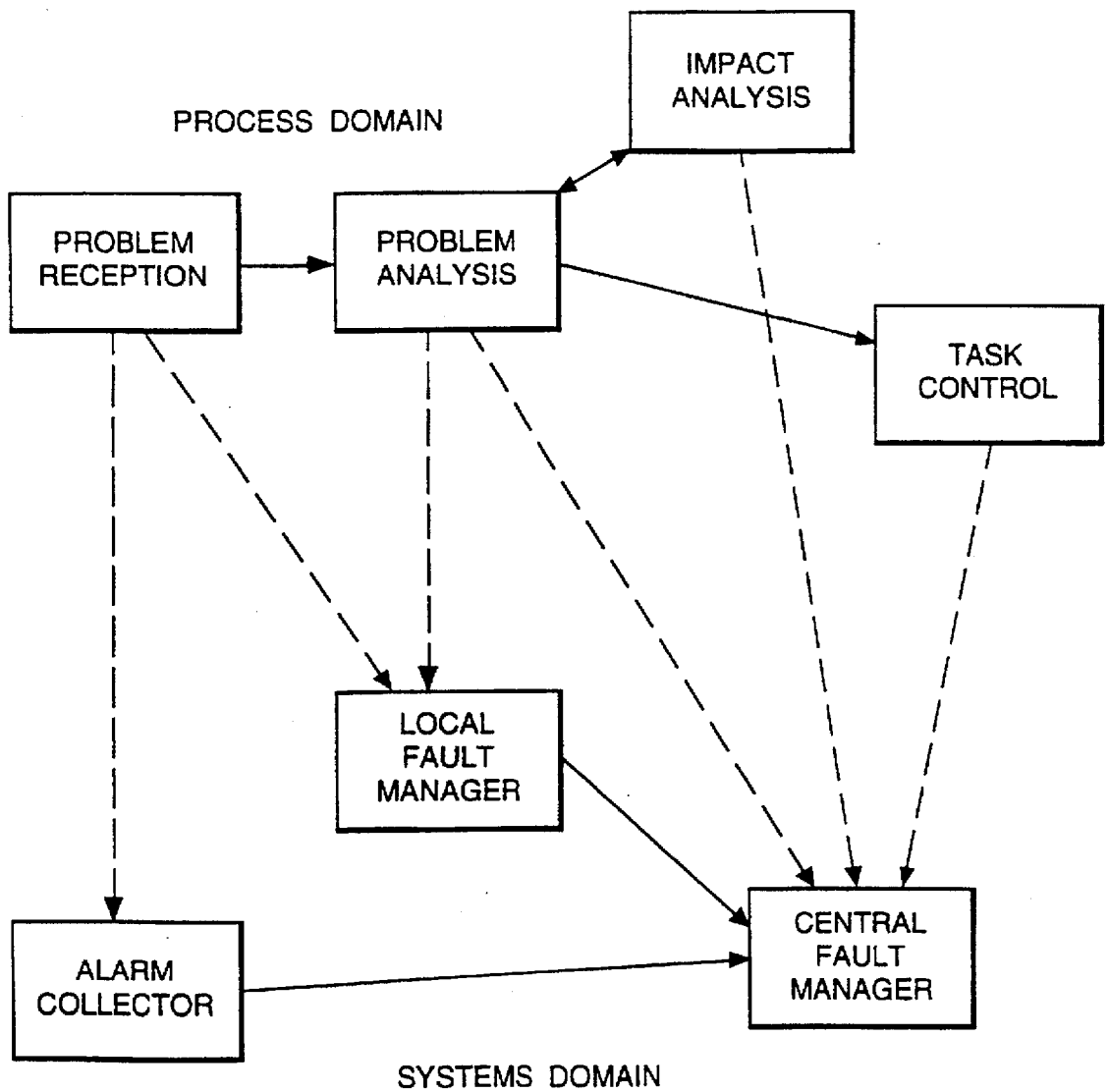
Figure 20A:
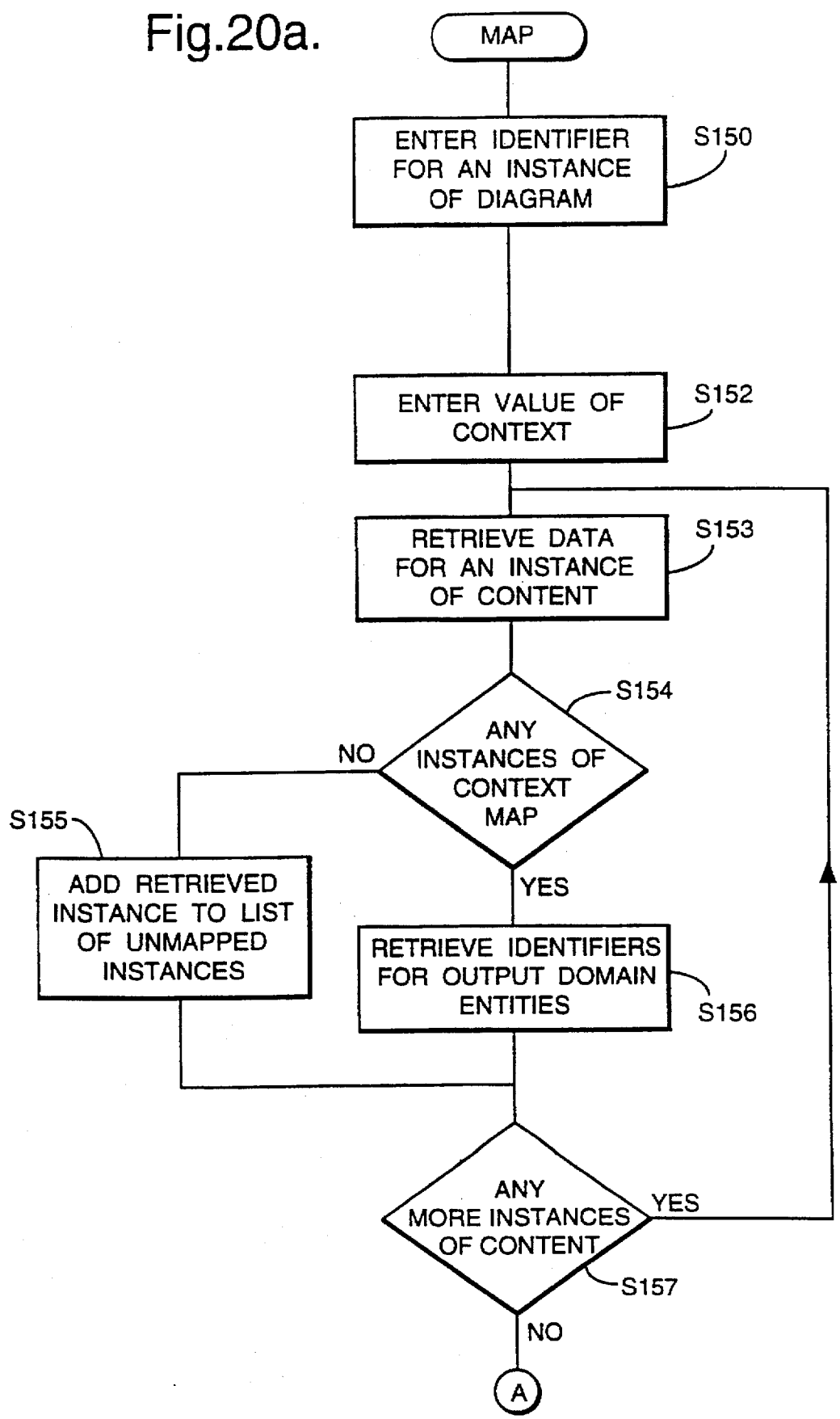
Figure 20B:
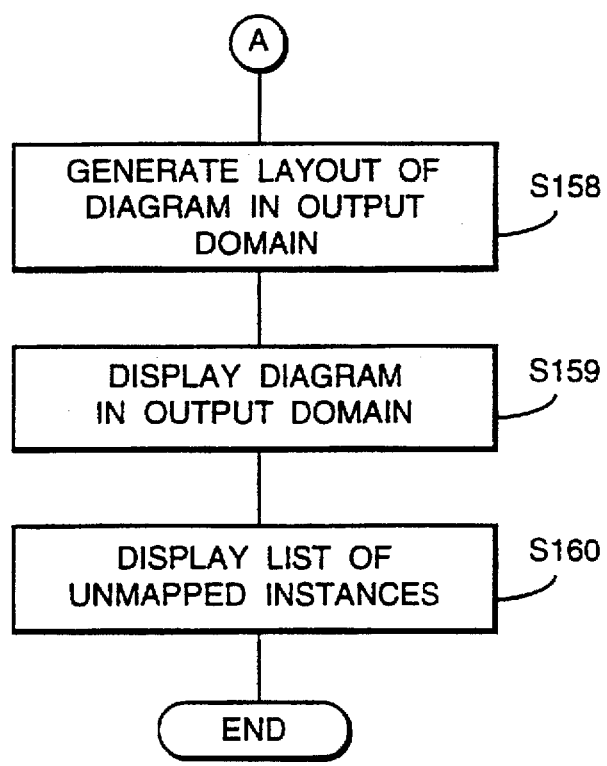

FIG. 6 including FIGS. 6a and 6b is a flow chart of a routine RETRIEVE used in the main program;

FIG. 7 is a diagram showing the network management centre together with four alarm collection centres which belong to the alarm management system of FIG. 4;

FIG. 8 including FIGS. 8a and 8b is a flow chart of a routine LINK forming part of the main program;

FIG. 9 is a diagram of the alarm management system of FIG. 4 and generally similar in layout to the diagram of FIG. 4 but showing the components which are present at a later date;

FIG. 10 is a diagram formed by combining FIGS. 4 and 9;

FIG. 11 including FIGS. 11a and 11b is a flow chart of a routine ADD forming part of the main program;

FIG. 12 is a flow chart of the alarm management system of FIG. 4 and generally similar to FIG. 4 but showing the components which are present at a date between the dates of the diagrams of FIGS. 4 and 9;

FIG. 13 including FIGS. 13a and 13b is a flow chart of a routine INTERPOLATE forming part of the main program;

FIG. 14 is a flow chart of a routine LIST forming part of the main program;

FIG. 15 is a diagram illustrating part of the management structure of a company;

FIG. 16 illustrates how stored data may be partitioned into scenarios;

FIG. 17 is a flow chart of a routine COPY which may form part of the main program;

FIG. 18 is a flow chart of a routine PROMOTE which may form part of the main program;

FIG. 19 illustrates the mapping between two diagrams representing a real world structure in two different domains; and FIG. 20 including FIGS. 20a and 20b is a flow chart of a routine MAP which may form part of the main program.

Figure 1:
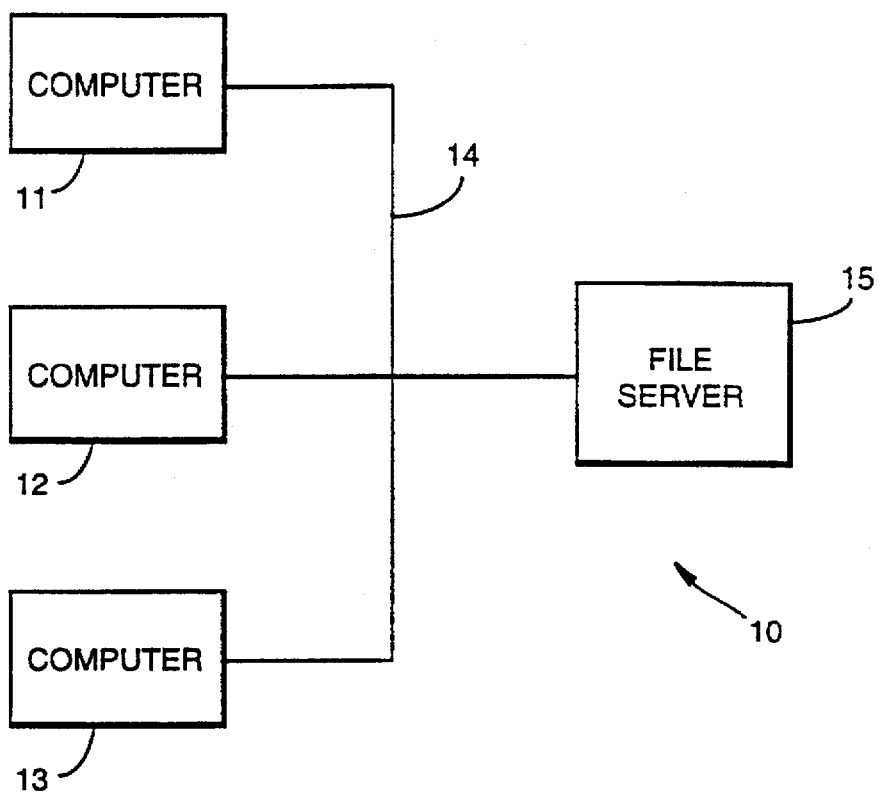
FIG. 1 is a block diagram of an apparatus embodying this invention.

Referring now to FIG. 1, there is shown an apparatus 10 for storing data for use in displaying diagrams. The apparatus 10 comprises three general purpose computers or workstations 11, 12, 13 connected by a communication link 14 to a file server 15. The file server 15 functions as a centralised data store for all three computers 11, 12, 13 and data for storage may be entered either at one of the computers 11, 12, 13 or directly into the file server. By providing three computers 11, 12, 13, three people may use the apparatus simultaneously and access the data stored in the file server 15. However, where it is required that only one person should be able to use the apparatus at any one time, it is sufficient to provide only one computer and the apparatus will be described below with reference to only computer 11.

Figure 2:
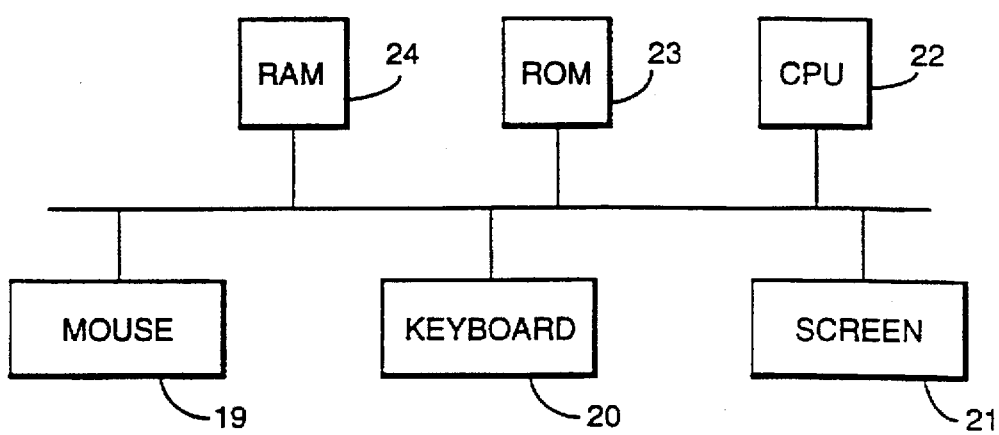
FIG. 2 is a block diagram showing the components of a computer forming part of the apparatus.

The computer 11 is of conventional construction and its main components are shown in FIG. 2. These components include a mouse 19, a keyboard 20, a visual display unit or screen 21, a central processing unit (CPU) 22, a read only memory (ROM) 23, and a random access memory (RAM) 24. In operation, programs and data may be loaded from the file server 15 into RAM 24.

Figure 3:
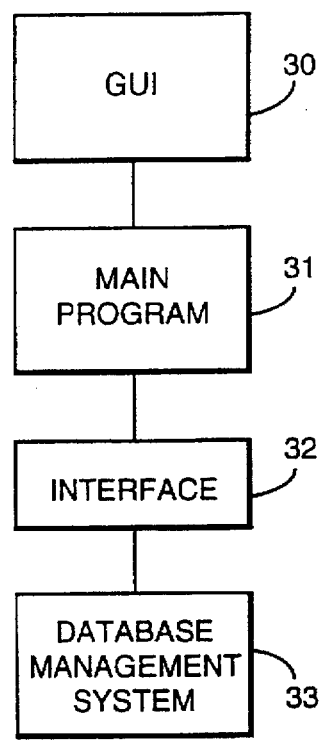
FIG. 3 shows the components of the software used in the apparatus of FIG. 1.

Referring now to FIG. 3, there are shown the components of the software or programs used in the apparatus 10. These components comprise a graphical user interface (GUI) 30, a main program 31, an interface 32 and a database management system 33. GUI 30 is formed from the two software packages AIDA and MASAI available from Ilog Limited of the Surrey Technology Centre, 40 Occam Road, Guildford, GU2 5YH, England. As the construction of GUIs is well known to those skilled in the art, GUI 30 will not be described in further detail.

The database management system 30 is the well known Oracle Database Management System. The main program 31 comprises routines STORE, RETRIEVE, LINK, ADD, INTERPOLATE and LIST which are described in detail below. In the present example, the main program 31 is written in the programming language LISP. The interface 32 functions as an interface between the main program 31 written in LISP and the Oracle Database management system 33. The interface 32 is the software package Asquell available from Ilog Limited.

The software components shown in FIG. 3 are stored in the file server 15 and may be loaded into the computer 11 when it is desired to use the apparatus.

Referring now to FIG. 4, there is shown a diagram illustrating some of the components of an alarm management system for a telecommunications network which are present at a certain date. In the present example, these components comprise switches A, B, C, alarm collection centre A, repair team A and a network management centre. In FIG. 4 these components are represented, respectively, by boxes 40 to 45. Each of these boxes is labelled with text which provides information, such as the name, about the component which it represents. As represented by flow lines 50, 51, 52, each of the switches A, B, C sends alarms to the alarm collection centre A. As illustrated by flow lines 53, 54, the alarm collection centre A sends reports to repair team A and the network management centre. Each of the flow lines 50 to 54 has a source and a destination. The source is located at the box which represents the component where information in the form of reports or alarms originates and the destination is connected to the box which represents the component to which the information is delivered. Each of the flow lines has an arrow at its destination. As may be observed, each of the flow lines is provided with text ("reports" or "alarms") indicating the name of the information which it carries.

The boxes 40 to 45 belong to one type of diagram entity while the flow lines 50 to 54 belong to another type of diagram entity.

The apparatus 10 operates in what is known as an object-oriented environment. In this environment, abstract or physical real world objects are modelled by software objects. The real world objects may be divided into object types. For example, the diagram boxes 40 to 45 belong to one type of real world object and the diagram flow lines 50 to 54 belonging to another type of real world object. The software implementation of an object type is known as an object class. A particular example of a software object class is known as instance of the object class or, more simply, as an object. Each software object class has a set of attributes. In the case of an instance of an object class, the attributes have values which collectively describe features of interest of the real world object which it models. The apparatus 10 uses four software object classes and these are: APPLICATION, INTERFACE, DIAGRAM and CONTENT. The attributes for these software classes are listed in Tables 1 to 4 below and these tables will now be described in turn. The attributes for the object class APPLICATION are shown in Table 1 below:

TABLE 1

| Name of object class: APPLICATION | |
|---|---|
| Attribute | Description |
| ID | unique identifier for entity |
| NAME | name of entity |
| START-DATE | start date of entity |
| END-DATE | end date of entity |
| VIEWER | security category for viewer |

The object class APPLICATION is used to describe a diagram entity in the form of a box. For a particular instance of the object class APPLICATION, the attributes are set as follows. ID is a unique identifier for the entity. NAME is both the name of the real world object represented by the box and also the text appearing inside the box. START-DATE and END-DATE together define the period of validity or existence of the real world object represented by the box. VIEWER gives the security level required by a viewer or user to see or edit a diagram which includes the box.

In the present example, the object class APPLICATION is the only object class for describing a graphical shape. More generally, there may be other object classes for other graphical shapes such as circles and ellipses. Each object class may also be associated with a certain type of data, for example data relating to a monitoring system, a group of people or a database. If desired, the graphical shape assigned to a particular class may be changed by the user.

The attributes for the object class INTERFACE are shown below in Table 2.

TABLE 2

| Name of object class: INTERFACE | |
|---|---|
| Attribute | Description |
| ID | unique identifier for entity |
| NAME | name of entity |
| VIEWER | security category for viewer |
| SOURCE-CLASS-ID | class of entity at source of line |
| SOURCE-ENTITY-ID | identifier of entity at source of line |
| DEST-CLASS-ID | class of entity at destination of line |
| DEST-ENTITY-ID | identifier of entity at destination of line |

An instance of INTERFACE describes a diagram entity in the form of a flow line. For each instance of this object class, the attributes are set as follows. ID and VIEWER are set in a similar manner to the corresponding attribute for an instance of APPLICATION. NAME is set to the text which appears on the flow line. SOURCE-CLASS-ID and SOURCE-ENTITY-ID are set to the name of the class and the identifier for the instance of that class for the diagram entity which appears at the source of the flow line. In the present example, the class is always APPLICATION but, more generally, flow lines could be connected to diagram entities of other classes for other graphical shapes such as circles or ellipses. DEST-CLASS-ID and DEST-ENTITY-ID give the name of the class and the identifier for the instance of that class for the diagram entity at the destination of the flow line.

The attributes for the class DIAGRAM are given in Table 3 below.

TABLE 3

| Name of object class: DIAGRAM | |
|---|---|
| Attribute | Description |
| ID | unique identifier for diagram |
| NAME | name of diagram |
| VIEW-DATE | date of diagram |
| VIEWER | security category for viewer |

Each instance of DIAGRAM provides general data relating to a particular diagram. A description of the attributes is set out clearly in Table 3.

The attributes for the object class CONTENT are set out below in Table 4.

TABLE 4

| Name of object class: CONTENT | |
|---|---|
| Attribute | Description |
| ID | unique identifier for this entity on the diagram |
| X-COORD | x co-ordinate of this entity on the diagram |
| Y-COORD | y co-ordinate of this entity on the diagram |

TABLE 4-continued

| Name of object class: CONTENT | |
|---|---|
| Attribute | Description |
| BOX-TYPE | type of box |
| LINE-TYPE | type of line |
| VIEWER | security category for viewer |
| DIAGRAM-ID | pointer to identifier for diagram |
| CLASS-ID | pointer to object class of entity |
| ENTITY-ID | pointer to unique identifier of entity |

Each instance of CONTENT gives the location and other details of an entity of a diagram on that diagram. Thus, X-COORD and Y-COORD give the x and y co-ordinates of the entity on the diagram. In the present example, the entity can be only a box or a flow line. If it is a box, BOX-TYPE describes the type of box. For example, the box may be rectangular with straight sides or rectangular with curved sides. LINE-TYPE describes the type of line, for example thick or thin, used to draw the box or the flow line. DIAGRAM-ID gives the unique identifier for an instance of DIAGRAM which contains general data relating to the diagram on which this entity is present. CLASS-ID and ENTITY-ID together define the instance of the object class which describes this entity. Thus, if the entity is a box, CLASS-ID is set to APPLICATION. If it is a flow line, then CLASS-ID is set to INTERFACE.

Figure 5:
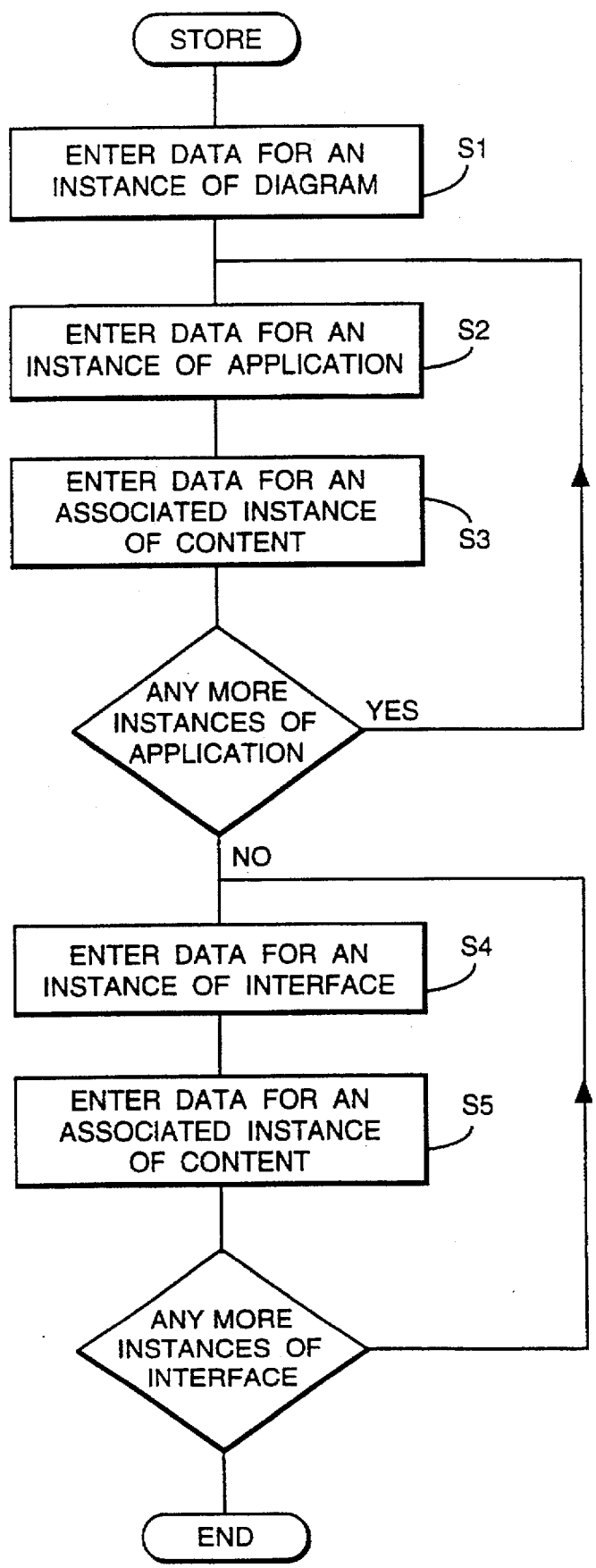
FIG. 5 is a flow chart of a routine STORE forming part of the main program of the apparatus of FIG. 1.

The routine STORE is used for storing data for subsequent use in displaying a diagram. The flow chart for this routine is shown in FIG. 5 and the flow chart will be described with reference to storing the diagram of FIG. 4.

In a step S1, general data for the diagram is entered and stored as an instance of DIAGRAM.

Then, in a step S2, data describing one of the boxes 40 to 45, for example box 40, is entered and stored as an instance of APPLICATION. In a step S3, data describing the location of the box and other associated data is entered and stored as an instance of CONTENT. Steps S2 and S3 are then repeated until an instance of APPLICATION and an instance of CONTENT have been created for each of the boxes 40 to 45.

In a step S4, data is entered which describes one of the flow lines, for example flow line 50, and stored as an instance of INTERFACE. Then in a step S5, data describing the location of the flow line and other associated data is stored as an instance of CONTENT. Steps S4 and S5 are repeated until an instance of INTERFACE and an instance of CONTENT has been created for each of the flow lines 50 to 54.

Where data is being stored for a whole set of diagrams, it is possible that some of the boxes and flow lines may appear in more than one diagram. Where this is the case, for each box or flow line which is present in more than one diagram, it is necessary to create only one instance of APPLICATION or INTERFACE. If the data for a particular instance of APPLICATION or INTERFACE is subsequently updated, this is effective for all diagrams which include this instance.

The routine RETRIEVE is used for retrieving data for displaying a diagram. The flow chart for this routine is shown in FIG. 6 and this will now be described with reference to the diagram of FIG. 4.

In a step S20, the identifier for the instance of DIAGRAM relating to the diagram of FIG. 4 is entered. Then, in a step S21, the instance of DIAGRAM is retrieved.

In a step S22, an instance of CONTENT is retrieved which points to the instance of DIAGRAM retrieved in step S21. The instance of CONTENT retrieved in S22 points to an instance of APPLICATION or INTERFACE. In S23, this instance of APPLICATION or INTERFACE is retrieved. In a step S24, a check is made to determine if there are any more instances of CONTENT. Steps S22 and S23 are repeated for each remaining instance of CONTENT which points to the instance of DIAGRAM retrieved in step S21 and for the associated instance of APPLICATION or INTERFACE.

At this point in executing the routine RETRIEVE, all the instances of CONTENT, APPLICATION and INTERFACE for the boxes 40 to 45 and flow lines 50 to 54 will be retrieved.

Each user of the apparatus has an associated security level. The security level will normally be allocated to each user by the person responsible for managing the apparatus. In a step S25, a check is made to determine if the user has an adequate security level to view the diagram. This is achieved by comparing the user's security level with the value of VIEWER for each instance of APPLICATION, INTERFACE, DIAGRAM and CONTENT which has been retrieved. If any one of these instances requires a security level greater than that possessed by the user, the user is denied access to the diagram. This is achieved by putting a suitable caption onto the display screen in a step S26 and then terminating execution of the routine.

If the user has an adequate security level, in a step S27, the diagram is displayed using the data which has been retrieved.

In a step S28, the user is asked if he wishes to edit the displayed diagram. If the user indicates that he does not wish to edit the displayed diagram, the routine is terminated. If the user indicates in step S28 that he wishes to edit the displayed diagram, the diagram is edited in step S29 and the routine is then terminated. The procedure of step S29 for editing the diagram will now be described.

In step S29, the user may edit the instance of DIAGRAM retrieved in step 21, any of the instances of CONTENT retrieved in step S22 and any of the instances of APPLICATION or INTERFACE retrieved in step S23. The user may edit any of these instances by displaying the attributes and their values and then changing the attribute value by using the keyboard 20. Alternatively, and preferably, the user may edit an instance by positioning a pointer over the relevant diagram entity with the aid of mouse 19. The user then clicks a button on the mouse and this causes an edit menu to be displayed. The user then edits the relevant instance by following the instructions on the edit menu.

When editing the instance of DIAGRAM retrieved in step S21, the user might change the security category of the viewer or the name of the diagram.

When editing one of the instances of CONTENT retrieved in step S22, the user might change its location by altering the values for its x and y co-ordinates. The user could also change the entity (box or flow-line) which is displayed by changing the pointer for the diagram entity. The user could also transfer the displayed entity to another diagram by altering the pointer for the diagram identifier.

When editing one of the instances of APPLICATION or INTERFACE retrieved in step S23, the user might change its name. In the case of an instance of INTERFACE, the user could change the identifier for the entity at its source or the identifier for the entity at its destination.

If an instance of APPLICATION or INTERFACE is edited in step S29, the changes will be effective in all diagrams in which the instance is used.

In step S29, a user may also delete or add instances of CONTENT, APPLICATION, INTERFACE and DIAGRAM.

Each of the classes APPLICATION, INTERFACE, DIAGRAM and CONTENT includes the attribute VIEWER which is used to specify the security of the viewer or user. In the present example, the same security category is used for both viewing and editing. Thus, if a user has an adequate security level to view a diagram, he may also edit the diagram. By way of modification, there may be separate security categories for viewing and editing. This would be achieved by providing two attributes in each class for security categories, one for viewing and one for editing. Where there are separate security categories for viewing or editing, a user may be given authority to view a diagram without being given authority to edit it.

When the present invention is used in a windowing environment, two or more diagrams may be displayed simultaneously on screen 21. Also specific diagram entities may be dragged by using mouse 19 from one diagram to another. When a diagram entity is dragged from one screen to another, it may be deleted from the first diagram and added to the second diagram. Alternatively, the diagram entity may be copied so that it remains in the first diagram and is added to the second diagram. This is achieved by creating and deleting instances of CONTENT as appropriate.

When a diagram entity is dragged from one diagram to another, the manner in which it is displayed may change. Thus, the shape, colour and scale of a diagram entity may change when it is dragged from one diagram to another. This is achieved by providing a set of display attributes for each class of diagram entity and providing values for these attributes for each instance of DIAGRAM. Thus, the display attributes could include an attribute COLOUR for specifying the colour in which an entity is displayed. Thus, for a particular instance of APPLICATION, the attribute COLOUR could be set to a value red for one instance of DIAGRAM and to a value green for another instance of DIAGRAM.

The ability to display two or more diagrams simultaneously and to drag diagram entities from one diagram to another may be achieved by using the following software: the Solaris operating system from SUN Microsystems Ltd, 31-41 Pembroke Broadway, Camberley, Surrey, GU15 3XD, together with the software package MASAI and LeLisp from Ilog Limited, Surrey Technology Centre, 40 Occam Road, Guildford, GU2 5YH.

When retrieving the data contained in the software objects, it is retrieved from the file server 15 and stored in RAM 24 of computer 11.

Referring back to FIG. 4, this figure shows the box 45 connected by flow line 54 to box 43. In other diagrams stored in the file server 15, there may be other boxes connected by other flow lines to the box 45. The routine LINK is capable of finding these other boxes and flow lines and generating a diagram which shows all the boxes and flow lines connected to box 45. An example of a diagram which may be produced by the routine LINK is shown in FIG. 7.

FIG. 7 shows box 43 connected by flow line 54 to box 45. This information is, of course, present on FIG. 4. FIG. 7 also shows boxes 60, 61, 62 connected by flow lines 63, 64, 65 to box 45. Boxes 60, 61 and 62 represent three further alarm collection centres, namely, alarm collection centres B, C and D. The flow chart for the routine LINK is shown in FIG. 8 and this flow chart will be described with reference to generating the diagram shown in FIG. 7.

The user initially selects the box which is of interest. In the present example, box 45 is selected. Then, in a step S40, the user enters the identifier for the instance of APPLICATION containing data describing box 45. The user may perform step S40 by typing in the characters of the identifier. Alternatively, there may already be a diagram displayed on the screen which shows box 45 and the user then positions a pointer over box 45 with the aid of the mouse 19 and clicks a button to indicate that this is the selected box.

In a step S41, the selected instance of APPLICATION is retrieved.

In a step S42, an instance of INTERFACE which describes a flow line connected to box 45 is retrieved. In the present example, this may be the instance of INTERFACE which describes the flow line 54. In a step S43, the instance of APPLICATION which describes the box connected to the other end of the flow line is retrieved. For example, if the instance of INTERFACE retrieved in step S42 describes flow line 54, then the instance of APPLICATION which describes box 43 is retrieved in step S43. In a step S44, a check is made to determine if there are any more instances of INTERFACE. Steps S42 and S43 are then repeated for all remaining instances of INTERFACE which describe flow lines connected to box 45 and the corresponding remaining instances of APPLICATION which describe the boxes connected to the other ends of these flow lines.

In step S45, a check is made to determine if the user has an adequate security level to view the boxes and flow lines which will be displayed. This step is similar to step S24 described with reference to FIG. 6. If the user does not have an adequate security level, access is denied to him in a step S46.

If the user has an adequate security level, in a step S47, the retrieved instances of APPLICATION are counted. In the present example, there are four such instances. In a step S48, the diagram is formatted. This is achieved by positioning the selected box at the centre of the diagram and then positioning the flow lines and boxes which are connected to the selected box at equal angular spacings around the selected box. In the present example, as there are four boxes connected to the selected box, they are displayed at 90° angles around the selected box.

In a step S49, the new diagram is displayed.

In the routine LINK, the instances of APPLICATION and INTERFACE retrieved in steps S41, S42 and S43 are retrieved from the file server 15 and loaded into RAM 24 of computer 11. Steps S45, S47, S48 and S49 are then performed with the data in RAM 24.

FIG. 9 shows the alarm management system of FIG. 4 at a later date. At the date shown in FIG. 9, switch A no longer exists and a new switch, namely switch D, has been added. In FIG. 9, switch D is represented by box 70 and flow line 71 shows alarms being passed from switch D to alarm collection centre A.

The apparatus 10 is capable of combining two diagrams representing a particular real world arrangement, such as the alarm management system of FIGS. 4 and 9, at two different dates. For example, it can combine the diagrams of FIGS. 4 and 9 to produce the diagram shown in FIG. 10. In FIG. 10, the boxes and flow lines which are present in both FIGS. 4 and 9 are shown in a first manner, namely by solid lines. The box 40 and flow line 50, which are present only in FIG. 4, are shown in a second manner, namely by dashed lines. The box 70 and the flow line 71, which are shown only in FIG. 9, are shown in the diagram of FIG. 10 in a third manner, namely with chain dotted lines. On a colour display screen, the solid, dashed and chain dotted lines of FIG. 10 may be replaced by three different colours.

The operation of combining two diagrams is performed by the routine ADD and the flow chart for this routine is shown in FIG. 11. The flow chart of FIG. 11 will now be described with reference to FIGS. 4, 9 and 10.

At the start of the routine, in a step S70 the user enters the identifier for the instance of DIAGRAM which contains general data for the first diagram. Thus, in the present example, the user enters the identifier for the instance of DIAGRAM for the diagram shown in FIG. 4. Then in a step S71, this instance of DIAGRAM is retrieved.

In a step S72, the instances of CONTENT, APPLICATION and INTERFACE for the first diagram are retrieved. Step S72 thus corresponds generally to steps S22 and S23 shown in FIG. 6.

Then, in a step S73, the user enters an identifier for the instance of DIAGRAM for the second diagram. In both steps S70 and S73, the identifier can be entered either by keying the characters which form the identifier or, if the diagrams are already displayed, by positioning a pointer over the diagram with the aid of mouse 19 and then clicking a button on mouse 19.

In steps S74 and S75, the instance of DIAGRAM and the instances of CONTENT, APPLICATION and INTERFACE for the second diagram are retrieved. In a step S76, a check is made to determine if the user has an adequate security level to view the boxes, flow lines and other data which will be shown in the eventual diagram. Thus step S76 corresponds generally to step S24 shown in FIG. 6. If the user does not have an adequate security level, access is denied to him in a step S77.

In a step S78, the diagram entities which are present in both the first and second diagrams are found. Step S78 is performed as follows. For each instance of CONTENT for the first diagram, it is determined if there is a corresponding instance of CONTENT for the second diagram which points to the same instance of APPLICATION or INTERFACE as the instance of CONTENT for the first diagram. The resulting instances of CONTENT, APPLICATION and INTERFACE are then associated with each other.

In a step S79, the diagram entities which are present in both diagrams are displayed in the first manner mentioned above. Thus, at this stage, boxes 41 to 45 and flow lines 51 to 54 are displayed as shown in FIG. 10.

In a step S80, the diagram entities which are present only in the first diagram are found. In order to achieve this, for each instance of CONTENT for the first diagram, it is determined if there is a corresponding instance of CONTENT for the second diagram which points to the same instance of APPLICATION or INTERFACE as the instance of CONTENT for the first diagram. If there is no corresponding instance of CONTENT for the second diagram, then the instance of CONTENT for the first diagram relates to a diagram entity present only in the first diagram. These instances of CONTENT together with the corresponding instances of APPLICATION and INTERFACE are then associated together.

Then, in a step S81, the diagram entities present only in the first diagram are displayed in the second manner. Thus, at this stage, box 40 and flow line 50 are added to the displayed diagram.

In a step S82, the diagram entities which are present only in the second diagram are found. This step is analogous to step S80.

Lastly, in a step S83, the entities present only in the second diagram are displayed in the third manner. Therefore, at this stage, box 70 and flow line 71 are added to the displayed diagram.

In steps S71, S72, S74 and S75, data is retrieved from the file server 15 and stored in RAM 24. Steps S76 to S83 are then performed on data in RAM 24. Because these steps are performed on data held in RAM 24, rather then in the file server 15, these steps are performed relatively quickly.

By way of modification, instead of combining FIGS. 4 and 9 to produce a new diagram in which the boxes and flow lines are represented in three different ways, the two diagrams may be kept separate. In this case, in both diagrams, the boxes and flow lines which are present in both diagrams are shown in a first manner, for example by solid lines. Boxes and flow lines which are present only in the first diagram are shown in the first diagram in a second manner, for example by dashed lines. Boxes and flow lines which are present only in the second diagram are shown in the second diagram in a third manner, for example by chain dotted lines.

Where file server 15 contains data for two diagrams having different dates but both showing the same real world arrangement, for example the alarm management system of FIG. 4, the apparatus 10 is capable of producing a further diagram showing those entities of the arrangement which are present at a specified date which is between the dates of the two diagrams. Thus, the apparatus is able to interpolate between two diagrams. FIG. 12 shows the result of interpolating between FIGS. 4 and 9 on a specified date. In the present example, FIG. 12 shows all the boxes and flow lines which are present in FIG. 4 and, in addition, shows box 70 and flow line 71 of FIG. 9. Thus, at the date of FIG. 12, switch D has been added but switch A has not yet been removed from the alarm management system.

The routine INTERPOLATE is responsible for interpolating between two diagrams and the flow chart for this routine in shown in FIG. 13. The flow chart of FIG. 13 will now be described with reference to FIGS. 4, 9 and 12.

After entering this routine, in a set of steps S90 to S95 corresponding to steps S70 to S75 shown in FIG. 11, the data for the two diagrams is retrieved from the file server 15 and loaded into RAM 24. Thus, in the present example, the data for both FIGS. 4 and 9 is retrieved in these steps. Subsequent steps are performed with the data in RAM 24.

In a step S96, corresponding to step S24 of FIG. 6, a check is made to determine if the user has an adequate security level to view the retrieved diagram entities. If the user does not have an adequate security level, access is denied in a step S97.

Then, in a step S98, the user enters the date of interpolation. In the present example, this will be the date of the diagram shown in FIG. 12.

Then, in a step S99, the diagram entities which are present at the date of interpolation are found. In order to achieve this, for each instance of CONTENT for the first diagram which points to an instance of APPLICATION, the values of START-DATE and END-DATE are compared with the date of interpolation. If the date of interpolation falls within the period covered by the values of START-DATE and END-DATE, then both the instance of CONTENT and the corresponding instance of APPLICATION are put on a list for display.

If the interpolation date does not fall within the period covered by the values of START-DATE and END-DATE, then the instance of CONTENT and the corresponding instance of APPLICATION are put on a list of entities which are not to be displayed.

Instances of CONTENT for the second diagram which point to instances of APPLICATION not present in the first diagram are then examined in a similar manner.

For each instance of APPLICATION which is on the list of entities which are not to be displayed, each instance of INTERFACE which describes a flow line connected to the box described by the instance of APPLICATION is found and also put on the list of entities which are not to be displayed.

In the present example, all of the diagram entities of FIG. 4 and in addition box 70 and flow line 71 of FIG. 9 are to be displayed and no diagram entities are excluded.

Then, in a step S100, the diagram entities present at the interpolation date are displayed.

Referring now to FIG. 14, there is shown the flow chart for the routine LIST. This routine is capable of producing a list of all the diagrams which contain a selected box.

After entering this routine, in a step 110, the user selects a box and enters the identifier for the instance of APPLICATION which describes the selected box. If a diagram is being displayed, the user may enter the identifier by clicking a button on mouse 19 with the mouse pointer over the selected box.

Next, in a step S111, the routine finds each instance of DIAGRAM which contains general data about a diagram which includes the selected box. This is achieved as follows. For each instance of DIAGRAM, all the instances of CONTENT which point to the instance of DIAGRAM are found. Each of these instances of CONTENT is examined to determine if it points to the instance of APPLICATION for the selected box. Then, in a step S112, a list is displayed of these instances of DIAGRAM.

If the user wishes to display a diagram corresponding to one of the instances of DIAGRAM on the list, the user may achieve this by using the routine RETRIEVE.

The diagram of FIG. 4 representing an alarm management system is only one example of the type of diagram which may be stored in the apparatus 10. FIG. 15 represents another type of diagram which may be stored and this figure shows part of the structure of a company together with reporting lines. Thus, FIG. 14 shows the main board represented box 100, department A represented by box 101, sections A, B, C represented by boxes 102, 103, 104, and the reporting lines represented by flow lines 105 to 108.

In a development of this invention, the diagram data is partitioned into scenarios and the scenarios are arranged in a hierarchical or parent-child structure. This development is suitable for modelling an evolving structure. By way of example, FIG. 16 shows how diagram data for modelling a telecommunications network may be partitioned into a parent scenario, namely a reference scenario, and three child scenarios, namely development scenarios A, B, C. The reference scenario contains diagram data for the network as presently existing and planned. The development scenarios contain diagram data for proposed developments to the network. If desired, the number of levels in the hierarchy may be increased, for example by creating child scenarios for development scenarios A, B and C.

With this development, a user of the system opts to work in a single scenario. Each user has a personal access profile which determines which scenarios he has permissions to read or edit. The scenario he selects defines the data which he can view or edit.

Each instance of APPLICATION, INTERFACE, DIAGRAM and CONTENT is owned by a single scenario. The VIEWER attribute is modified to point to the owning scenario rather than an individual user. Instances owned by the parent scenario can be viewed by the child scenario, but instances owned by the child scenario cannot be viewed by the parent. In addition, instances of APPLICATION and INTERFACE which are owned by the parent scenario may be used as diagram entities in the child scenario. In this case, the DIAGRAM and CONTENT instances are owned by the child scenario, but ownership of the APPLICATION and INTERFACE instances remain with the parent scenario.

The attributes of an instance may only be edited whilst working in its owning scenario. However, an instance owned by the parent scenario may be modified in a child scenario by creating a copy of the instance which is owned by the child scenario. Instances created or modified in the child scenario may then be promoted to the parent scenario. In order to achieve this, routines COPY and PROMOTE are added to the main program 31. These two routines will now be described.

The routine COPY is used for copying diagram data from a parent scenario to a child scenario. Referring now to FIG. 17, after entering the routine COPY, in a step S132 a check is made to determine if the user wishes to copy the data for any of the diagrams owned by the parent scenario. If the user does wish to copy data for one or more of the the diagrams in the parent scenario, this is achieved in step S133.

In step S133, for each diagram selected by the user, data is copied for the respective instance of DIAGRAM and all instances of CONTENT which point to the copied instance of DIAGRAM. Each copied instance is given a new identifier so that a particular instance is owned by one scenario only. In addition, each copied instance is given a pointer which points to the corresponding instance in the parent scenario. The new instances of CONTENT point to instances of APPLICATION and INTERFACE which are owned by the parent scenario. After step S132 or step S133, the routine continues with step S134.

In step S134, a check is made to determine whether the user wishes to copy any individual instances of APPLICATION or INTERFACE from the parent scenario to the child scenario. If the user does wish to copy any of these instances, this is achieved in step S135. In step S135, the data for each selected instance is copied from the parent scenario to the child scenario. Each copied instance is given a new identifier so that a particular instance is owned by one scenario only. In addition, each copied instance is given a pointer which points to the corresponding instance in the parent scenario.

After step S134 or S135, the routine continues with step S136 in which the diagrams in the child scenario are edited. This is achieved in the manner described with reference to step S28 in FIG. 6. Although not shown, the use may return to steps S133 or S135 to copy further diagrams or instances if this is necessary during editing.

The routine PROMOTE is used for promoting diagram data from a child scenario to a parent scenario. This routine may be used to promote all the data owned by the child scenario to the parent scenario, or the data for selected diagrams to the parent scenario, or the data for selected instances to the parent scenario. This routine will now be described with reference to FIG. 18.

After entering the routine PROMOTE, in a step S140 a check is made to determine if the user wishes to promote all the data from the child scenario to the parent scenario. If the user does wish to transfer all the data, this is achieved in a step S141.

In step S141, the data for each instance in the child scenario is used to replace the existing data for the corresponding instance in the parent scenario. This is achieved by using the pointers in the instances in the child scenario which point to the corresponding instances in the parent scenario. Data for new instances in the child scenario is also added to the data contained in the parent scenario.

Deletion of instances in the child scenario is handled by marking the instances as DELETED, rather than physically removing them from the database. Consequently, if an instance is deleted in the child scenario, the corresponding instance in the parent scenario will be overwritten by an instance marked as DELETED. This 'soft deletion' method ensures that deletion of the instance is made visible to all scenarios which make use of the instance and gives users of these scenarios an opportunity to make any necessary changes. Periodically, the database is purged to permanently remove instances which have been marked as DELETED for a significant period, e.g. 6 months.

It is possible that there will be a conflict between data contained in the child scenario and data contained in the parent scenario. For example, promoting data from the child scenario to the parent scenario may result in a new diagram entity in the child scenario overlapping with an existing entity in the parent scenario. Any such conflicts are recorded in step S141 for resolution in step S146. The routine continues with step S146 after step S141.

If the user does not wish to promote the entire child scenario to the parent scenario, a check is made in step S142 to determine if the user wishes to promote the data for any of the diagrams of the child scenario to the parent scenario. If the user does wish to promote any of the individual diagrams, this is achieved in step S143.

In step S143, the data for the instance of DIAGRAM for the selected diagram, together with the data for the associated instances of APPLICATION, INTERFACE and CONTENT which are owned by the child scenario are used to replace the data for the corresponding instances in the parent scenario. Any conflicts are recorded for resolution in step S146. After step S142 or step S143, the routine continues with step S144.

In step S144, a check is made to determine if the user wishes to promote the data for any individual instances of APPLICATION or INTERFACE from the child scenario to the parent scenario. If the user does wish to promote the data for any of the individual instances, this is achieved in step S146.

In step S145, the user may select the instances to be promoted from an index of instances. Alternatively, a diagram from the child scenario may be displayed simultaneously with the corresponding diagram from the parent scenario. In this case, the individual instances are promoted by dragging the corresponding diagram entities with the aid of mouse 19 from the child diagram to the parent diagram.

After step S144 or step S145, the routine continues with step S146 in which conflicts are resolved. By way of example, in step S146, where a diagram entity in the child scenario has been found to overlap a diagram entity in the parent scenario, the conflict may be resolved by the user by deleting the diagram entity in the parent scenario.

In a further development, the present invention can generate a diagram representing a real world structure in one domain ("the output domain") from a diagram representing the same real world structure in another domain ("the input domain"). By way of example, this further development will be described with reference to a public telecommunications network in which the input domain is the process domain and the output domain is the systems domain. FIG. 19 shows, by way of example, a diagram in its upper half which represents fault management for part of the network in the process domain. In its lower half, FIG. 19 shows the corresponding diagram in the systems domain. The dashed lines show the links or mappings between the components of the diagram in the process domain and the components of the diagram in the systems domain.

In this further development, the object class APPLICATION is used to describe diagram entities in the form of boxes which represent components of the telecommunications network in the systems domain. With this further development, an additional object class PROCESS is used. The object class PROCESS is used to describe diagram entities in the form of boxes which represent components of the telecommunications network in the process domain. The attributes for the object class PROCESS are shown in Table 5 below:

TABLE 5

Name of object class: PROCESS

| Attribute | Description |
| --- | --- |
| ID | Unique identifier for entity |
| NAME | Name of entity |
| VIEWER | Security category for viewer |

Although in the present example there is only a single object class for describing diagram entities in each domain, in general there may be one or more object classes for describing diagram entities in each domain.

The links between diagram components in the input domain and diagram components in the output domain are held in instances of an object class CONTEXT MAP. More specifically, each instance of CONTEXT MAP holds a link between one diagram component in the input domain (for example, an instance of PROCESS) and one diagram component in the output domain (for example, an instance of APPLICATION). A diagram component in the input domain may have more than one link to diagram components in the output domain. For example, in FIG. 19, the diagram component named Problem Reception in the process domain has a link to Alarm Control and a link to Load Fault Manager in the output domain.

The attributes for the object class CONTEXT MAP are shown in FIG. 6 below.

TABLE 6

Name of object class: CONTEXT MAP

| Attribute | Description |
| --- | --- |
| ID | Unique identifier for instance |
| INPUT_CLASS_ID | Pointer to object class of diagram entities in input domain |
| INPUT_INSTANCE_ID | Pointer to unique identifier for diagram entity in input domain |
| OUTPUT_CLASS_ID | Pointer to object class of diagram entities in output domain |
| OUTPUT_INSTANCE_ID | Pointer to unique identifier for diagram entity in output domain |
| CONTEXT | Context in which mapping occurs |
| VIEWER | Security category for viewer |

The attributes ID and VIEWER are set in a similar manner to the corresponding attributes for the other classes described above. INPUT_CLASS_ID is set to the name of one of the object classes ("the input object class") used to describe the diagram entities which represent the components of the modelled structure in the input domain. In the present example, the input object class is PROCESS. INPUT_INSTANCE_ID is set to the value of the unique identifier for the instance ("the input instance") of this object class.

OUTPUT_CLASS_ID is set to the name of one of the object classes ("the output object class") used to describe the diagram entities which represent the components of the modelled structure in the output domain. In the present example, the output object class is APPLICATION. OUTPUT_INSTANCE_ID is set to the value of the unique identifier for the instance ("the output instance") of this object class.

CONTEXT specifies the context in which the mapping occurs. For example, for fault management in a public telecommunications network there may be one mapping for fault management in the trunk network and another mapping for fault management in the access network. Where mappings can occur only in a single context, the attribute CONTEXT is not needed. In the present example, it is assumed that the mapping is in the trunk network.

Referring now to FIG. 20, there is shown a flow chart for a routine MAP which is used to generate a diagram in an output domain from a diagram in an input domain.

After entering the routine MAP, in a step S150, the user enters the identifier for the instance of DIAGRAM which describes the diagram in the input diagram. In the present example, the user enters the identifier for the diagram shown in the upper half of FIG. 19. Then in a step S152, the user enters the value of the attribute CONTEXT. In the present example, the value indicates that the context for mapping from the input domain to the output domain is the trunk network.

Next, in a step S153, data is retrieved for an instance of CONTENT which points to the instance of DIAGRAM retrieved in step S150.

In step S154, it is determined if there are any instances of CONTEXT MAP for which the input instance is the instance found in step 153. If there are no such instances, the instance found in step S153 is put on a list of unmapped instances in a step S155.

If, in step S154, it is found that there are instances of CONTEXT MAP for which the input instance is the instance retrieved in step S153, the routine goes from step S154 to step S156. In step S156, for each instance of CONTEXT MAP for which the input instance is the instance retrieved in step S153, the identifier and the class name for the corresponding output instance are retrieved. Thus, in the present example, one or more identifiers for the object class APPLICATION are retrieved.

After step S155 or step S156, the routine continues with step S157. In this step, a check is made to determine if there are any more instances of CONTENT which point to the instance of DIAGRAM retrieved in step S150. If there are any such instances, the routine returns to step 153. If there are no such instances, the routine continues with step S158.

By the time the routine reaches step S158, in the present example there will have been retrieved a number of instances of APPLICATION. Some of these instances may have been retrieved several times. In the example shown in FIG. 19, providing all the relevant instances of CONTEXT MAP exist, the instance of APPLICATION for the box labelled Central Fault Manager will have been retrieved three times. In step S158, using an appropriate algorithm, these instances of APPLICATION are used to generate the layout for a diagram in the output domain. A suitable diagram is described in an article entitled "Graph Drawing by Force Directed Placement", Software Practice and Experience, Volume 21(11), pages 1129–1164, November 1991. This article is incorporated herein by reference.

Next, in a step S159, the output domain diagram generated in step S158 is displayed. However, if any unmapped instances have been found in step S154, the diagram will be incomplete.

Finally, in a step S160, the list of unmapped instances is displayed. If there are any unmapped instances, the user can then create appropriate instances of CONTEXT MAP so that the instances are no longer unmapped. The routine may then be run again so as to obtain a complete diagram in the output domain.

We claim:

1. A computer apparatus for storing data for use in displaying diagrams, each diagram comprising a plurality of entities, said apparatus comprising:
   means for entering data for use in displaying diagrams;
   means for storing data describing an individual diagram entity as a software object having a set of attributes which includes an identifier for the software object;
   means for storing general data relating to an individual diagram as a software object whose attributes include an identifier for the software object;
   means for storing data relating to the location of an individual entity on a diagram as a software object whose attributes include the location of the entity on the diagram and a pointer to the software object which describes the entity;
   means for retrieving data describing individual entities of a diagram; and
   means for using the retrieved data for displaying a diagram.

2. An apparatus as in claim 1, in which in the means for storing data relating to the location of an individual entity on a diagram as a software object, the attributes of the software object further include a pointer to the software object further include a pointer to the software object containing general data relating to the diagram.

3. An apparatus as in claim 1, in which the entities include graphical shapes and flow lines connecting the graphical shapes together.

4. An apparatus as in claim 3, in which data describing an entity in the form of a graphical shape is stored as a software object belonging to a software object class for graphical shapes, and data describing an entity in the form of a flow line is stored as a software object belonging to a software object class for flow lines whose attributes include a pair of pointers which point to the identifiers of the two software objects which describe, respectively, the entity at one end and the entity at the other end of the flow line.

5. An apparatus as in claim 4, including:
   first means for finding a software object belonging to a software object class for graphical shapes which describes a graphical shape selected by a user of the apparatus;
   second means for finding each software object belonging to the software object class which represents a flow line having one end connected to the selected graphical shape; and
   third means for finding the software objects belonging to the software object class for graphical shapes which describe the graphical shapes connected to the other ends of said flow lines;
   said data displaying means being arranged to use the data contained in the software objects found by said first, second and third software object finding means to display the selected graphical shape together with the flow lines having one end connected to the selected graphical shape and the graphical shapes connected to the other end of the flow lines.

6. An apparatus as in claim 3, in which the attributes of each software object which represents a graphical shape include a period of validity for the graphical shape.

7. An apparatus as in claim 6, including:
   first means for finding software objects representing entities which together form a first diagram selected by a user of the apparatus, said first diagram representing a particular physical or abstract arrangement on a first date;
   second means for finding software objects representing entities which together form a second diagram selected by the user, said second diagram representing said particular physical or abstract arrangement on a second date; and
   means for selecting those software objects from the software objects found by the first and second software object finding means which represent entities valid on a date specified by the user, said specified data falling between said first and second dates; and
   said data displaying means being arranged to use the data contained in software objects selected by the software object selecting means to display a diagram containing the entities which are valid on the specified date.

8. An apparatus as in claim 1, including means for operating on the retrieved data in a predetermined manner to produce a desired diagram.

9. An apparatus as in claim 1 including:
   first means for finding software objects representing entities which together form a first diagram selected by a user of the apparatus;
   second means for finding software objects representing entities which together form a second diagram selected by the user;
   third means for finding software objects representing entities which are present in both the first and second diagrams;
   fourth means for finding software objects representing entities present only in the first diagram; and
   fifth means for finding software objects representing entities present only in the second diagram;
   said data displaying means being arranged to display entities present in both the first and second diagrams in a first manner, entities present only in the first diagram in a second manner, and entities present only in the second diagram in a third manner.

10. An apparatus as in claim 1, in which for at least some of the software objects, the attributes of the software object include the security level required by a user of the apparatus to view a diagram including the entity represented by the software object.

11. An apparatus as in claim 1, in which said data storing means is arranged to partition the stored data into a set of scenarios arranged in hierarchical manner, said apparatus further including:
   means for copying data from a higher level scenario to a lower level scenario; and means for promoting data from a lower level scenario to a higher level scenario.

12. An apparatus as in claim 11, including means for reusing data from a higher level scenario in a lower level scenario without copying the data to the lower level scenario.

13. An apparatus as in claim 1 further including means for generating a diagram containing graphical shapes which represent components of a real world structure in one domain from a diagram containing graphical shapes which represent the same real world structure in another domain.

14. A computer apparatus including a central processing unit, a memory, means for entering data and a display unit, said memory containing a program for controlling the computer apparatus and which is arranged to:

receive data for use in displaying diagrams;

store data representing an individual diagram entity as a software object having a set of attributes which includes an identifier for the software object;

store general data relating to an individual diagram as a software object whose attributes include an identifier for the software object;

store data relating to the location of an individual entity on a diagram as a software object whose attributes include the location of the entity on the diagram and a pointer to the software object which describes the entity;

retrieve data describing individual diagram entities of a diagram; and use the retrieval data for displaying a diagram.

15. A method of operating a computer apparatus for storing diagram data and using the stored data for displaying diagrams, each diagram comprising a plurality of entities, said method comprising the steps of:

storing data describing each individual diagram entity as a software object having a set of attributes which includes an identifier for the object;

storing general data relating to each individual diagram as a software object whose attributes include an identifier for the software object;

storing data relating to the location of each individual entity of a diagram as a software object whose attributes include the location of the entity on the diagram and a pointer to the software object which describes the entity;

retrieving data describing individual entities of a diagram; and using the retrieved data for displaying a diagram.

16. A method as in claim 15 in which in said step of storing data relating to the location of each individual entity of a diagram as a software object, the attributes of the software object include a pointer to the software object containing general data relating to the diagram.

17. A method as in claim 15, in which the entities include graphical shapes and flow lines connecting the graphical shapes together.

18. A method as in claim 17, in which data describing an entity in the form of a graphical shape is stored as a software object belonging to a software object class for graphical shapes and data describing an entity in the form of a flow line is stored as a software object belonging to a software object class for flow lines whose attributes include a pair of pointers which point to the identifier of the two software objects which describe, respectively, the entity at one end and the entity at the other end of the flow line.

19. A method as in claim 15, including the step of operating on the retrieved data in a predetermined manner to produce a desired diagram.

* * * * *